(12) United States Patent
Park

(10) Patent No.: US 11,848,784 B2
(45) Date of Patent: Dec. 19, 2023

(54) METHOD AND APPARATUS FOR PERFORMING HARQ OPERATION

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 440 days.

(21) Appl. No.: 17/212,082

(22) Filed: Mar. 25, 2021

(65) Prior Publication Data

US 2021/0306106 A1 Sep. 30, 2021

Related U.S. Application Data

(63) Continuation of application No. PCT/KR2019/012666, filed on Sep. 27, 2019.

(30) Foreign Application Priority Data

Sep. 28, 2018 (KR) .......................... 10-2018-0116048

(51) Int. Cl.
*H04L 1/1867* (2023.01)
*H04W 72/23* (2023.01)
*H04L 1/1812* (2023.01)
*H04W 4/40* (2018.01)
*H04W 72/0446* (2023.01)

(52) U.S. Cl.
CPC .......... *H04L 1/1819* (2013.01); *H04L 1/1896* (2013.01); *H04W 4/40* (2018.02); *H04W 72/0446* (2013.01); *H04W 72/23* (2023.01)

(58) Field of Classification Search
None
See application file for complete search history.

(56) References Cited

U.S. PATENT DOCUMENTS

| 2018/0242317 | A1 | 8/2018 | Marinier et al. |
| 2019/0052436 | A1* | 2/2019 | Desai .................... H04L 5/0055 |
| 2022/0053496 | A1* | 2/2022 | Yu .......................... H04L 1/1896 |

FOREIGN PATENT DOCUMENTS

| KR | 1020170108987 A | 9/2017 |
| WO | 2017171528 A1 | 10/2017 |
| WO | 2017192009 A1 | 11/2017 |
| WO | 2018004323 A1 | 1/2018 |

(Continued)

OTHER PUBLICATIONS

Thien Thi Thanh Le, Sangman Moh (Member, IEEE), "Comprehensive Survey of Radio Resource Allocation Schemes for 5G V2X Communications", IEEE Access, Aug. 11, 2021, pp. 1-17. [accepted Aug. 23, 2021, date of publication Sep. 3, 2021, date of current version Sep. 13, 2021].

(Continued)

*Primary Examiner* — Ajit Patel

(57) ABSTRACT

A method and apparatus for performing a sidelink Hybrid Automatic Repeat Request (HARQ) operation are provided. The method may include establishing a communication session through an upper layer signaling; receiving configuration information for a HARQ operation through the upper layer; receiving downlink control information (DCI) from a network; transmitting sidelink data through a sidelink channel based on the received DCI; and receiving a response to the sidelink data.

24 Claims, 17 Drawing Sheets

(56) References Cited

FOREIGN PATENT DOCUMENTS

| WO | 2018062857 A1 | 4/2018 |
|---|---|---|
| WO | 2018174761 A1 | 9/2018 |

OTHER PUBLICATIONS

Nokia, Alcatel-Lucent Shanghai Bell, "Data lossless path switch", 3GPP TSG-RAN WG2 Meeting #97bis, R2-1703365, Spokane, USA, Apr. 3-7, 2017, pp. 1-3.
Extended European search report, European Patent Application No. 19 867 691.8 from European Patent Office dated Jun. 15, 2022.
Examination report under sections 12 & 13 of the Patents Act, 1970 and the Patents Rules, 2003 for Application No. 202117019257 from Intellectual Property India dated Jun. 13, 2022.
International Search Report for International Patent Application No. PCT/KR2019/012666, dated Jan. 23, 2020.
Written Opinion for International Patent Application No. PCT/KR2019/012666, dated Jan. 23, 2020.
"3rd Generation Partnership Project; Technical Specification Group Radio Access Network; NR; Multiplexing and channel coding (Release 15)", 3GPP TS 38.212 V15.3.0, Sep. 2018, pp. 1-99, 3GPP Organizational Partners.
"3rd Generation Partnership Project; Technical Specification Group Radio Access Network; NR; Physical layer procedures for control (Release 15)", 3GPP TS 38.213 V15.2.0, Jun. 2018, pp. 1-99, 3GPP Organizational Partners.
"3rd Generation Partnership Project; Technical Specification Group Radio Access Network; NR; Physical layer procedures for data (Release 15)", 3GPP TS 38.214 V15.2.0, Jun. 2018, pp. 1-95, 3GPP Organizational Partners.
"3rd Generation Partnership Project; Technical Specification Group Radio Access Network; NR; Radio Resource Control (RRC) protocol specification (Release 15)", 3GPP TS 38.331 V15.3.0, Sep. 2018, pp. 1-445, 3GPP Organizational Partners.

* cited by examiner

METHOD AND APPARATUS FOR PERFORMING HARQ OPERATION

CROSS-REFERENCE TO RELATED APPLICATIONS

This application is a continuation of pending PCT International patent application No. PCT/KR2019/012666, filed on Sep. 27, 2019, which claims priority from and the benefit of Korean Patent Application No. 10-2018-0116048, filed on Sep. 28, 2018, each of which is hereby incorporated by reference in its entirety.

BACKGROUND

1. Technical Field

The present disclosure relates to a method and a procedure for a time resource allocation scheme for a Hybrid Automatic Repeat Request (HARQ) operation.

2. Discussion of the Background

The International Telecommunication Union (ITU) has developed International Mobile Telecommunication (IMT) framework and standards. Also, discussion for 5-th generation (5G) communication is ongoing through a program called "IMT for 2020 and beyond".

To meet the requirements requested by "IMT for 2020 and beyond", discussion is being made to support various numerologies about a time-frequency resource unit standard by considering various scenarios, service requirements, and potential system compatibility in a 3-rd Generation Partnership Project (3GPP) new radio (NR) system.

Vehicle-to-everything (V2X) communication may be a communication method of exchanging or sharing road infrastructures during driving and information, such as traffic conditions, through communication with other vehicles. V2X may include, for example, vehicle-to-vehicle (V2V) that may be long term evolution (LTE)-based communication between vehicles, vehicle-to-pedestrian (V2P) that may be LTE-based communication between a vehicle and a user equipment (UE) carried by a user, and vehicle-to-infrastructure/network (V2I/N) that may be LTE-based communication between a vehicle and a roadside unit (RSU)/network. The RSU may be a transportation infrastructure entity configured by a base station or a fixed terminal, such as, for example, an entity that transmits a speed notification to a vehicle.

SUMMARY

An aspect of the present disclosure provides a method and apparatus for performing a Hybrid Automatic Repeat Request (HARQ) operation associated with sidelink.

According to an aspect of the present disclosure, there is provided a method of performing, by a user equipment (UE), a sidelink Hybrid Automatic Repeat Request (HARQ) operation in a new radio (NR) vehicle-to-everything (V2X) system. Here, the HARQ operation performing method may include establishing a communication session through an upper layer signaling; receiving configuration information for a HARQ operation through the upper layer; receiving downlink control information (DCI) from a base station; transmitting data through a sidelink based on the received DCI; and receiving a Physical Sidelink HARQ-feedback Indicator Channel (PSHICH).

According to the present disclosure, there may be provided a method and apparatus for performing a Hybrid Automatic Repeat Request (HARQ) operation associated with a sidelink.

DETAILED DESCRIPTION

Figure 1:
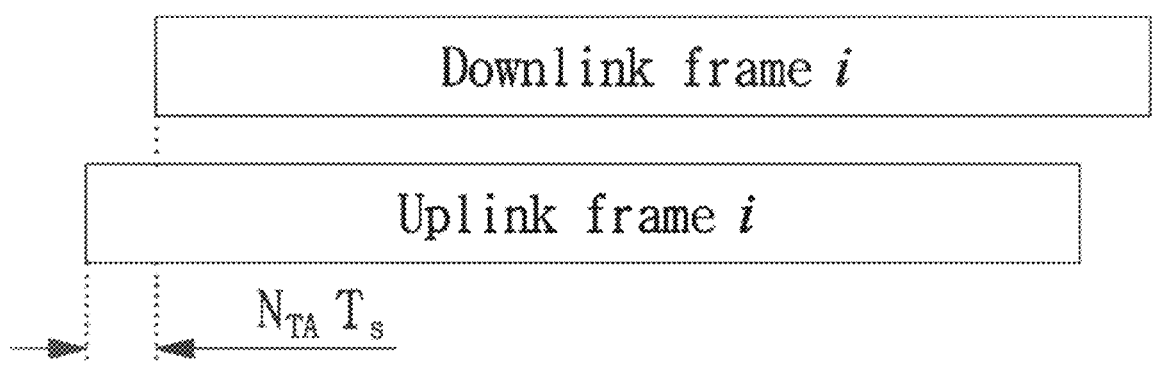
FIG. 1 illustrates an example of a frame structure for downlink/uplink transmission according to the present disclosure.

Hereinafter, examples of the disclosure will be described in detail with reference to enclosed drawings, so that those skilled in the art could easily implement the examples. However, the disclosure could be implemented in different manners, and is not limited to the examples described below.

In describing the examples, detailed descriptions of known configurations or functions may be omitted for clarity and conciseness. In the drawings, a portion that is irrelevant to the detailed description is omitted and the like drawing reference numerals are understood to refer to the like elements, features, and structures.

In the disclosure, if an element is "linked to", "coupled to", or "connected to" another element, this expression includes an indirect connection in which another element is present between the two elements, in addition to a direct connection. In addition, if an element "includes" or "has" another element, and unless otherwise indicated, the element may not exclude another element but may further include another element.

In the disclosure, the term, "first", "second", or the like is only used for the purpose of distinguishing one element from another element, and unless otherwise stated, is not used to define the order or importance of elements. Therefore, a first element in one example may be referred to as a second element in another element, and in the same manner, a second element in one example may be referred to as a first element in another example, within the scope of the disclosure.

In the disclosure, elements are distinguished from each other for clearly describing respective features thereof, but the elements are necessarily separated. That is, a plurality of elements may be integrated to be a single piece of hardware or software, and one element may be separately implemented in plurality of pieces of hardware or software. Therefore, unless otherwise mentioned, an example in which elements are integrated or an example in which an element is separately implemented may fall within the scope of the disclosure.

In the disclosure, elements described in various examples may not be necessarily essential elements, and some of them may be optional elements. Therefore, an example that includes a subset of the elements described in an example may fall within the scope of the disclosure. In addition, an example that further includes other elements in addition to the elements described in various examples may fall within the scope of the disclosure.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto. Also, the term "NR system" used herein is used as an example of a wireless communication system capable of supporting various subcarrier spacings (SCSs). However, the term "NR system" itself is not limited to the wireless communication system that supports the plurality of SCSs.

FIG. 1 illustrates an example of an NR frame structure and a numerology according to an example of the present disclosure.

In NR, a basic unit of a time domain may be $T_c=1/(\Delta f_{max} \cdot N_f)$. Here, $\Delta f_{max}=480 \cdot 10^3$ and $N_f=4096$. Also, $\kappa=T_s/T_c=64$ may be a constant about a multiple relationship between an NR time unit and an LTE time unit. In LTE, $$T_s = \frac{1}{\Delta f_{ref} \cdot N_{f,ref}},$$

$\Delta f_{ref}=15 \cdot 10^3$ Hz, and $N_{ref}=2048$ be defined as a reference time unit.

Example Frame Structure

Referring to FIG. 1, a time structure of a frame for a downlink/uplink (DL/UL) transmission may include $T_f=(\Delta f_{max} N_f/100) \cdot T_s=10$ ms. Here, a single frame may include 10 subframes corresponding to $T_{sf}=(\Delta f_{max} N_f/1000) \cdot T_s=1$ ms. A number of consecutive orthogonal frequency division multiplexing (OFDM) symbols per subframe may be $N_{symb}^{subframe,\mu}=N_{symb}^{slot} N_{slot}^{subframe,\mu}$. Also, each frame may be divided into two half frames and the half frames may include 0~4 subframes and 5~9 subframes. Here, half frame 1 may include 0~4 subframes and half frame 2 may include 5~9 subframes.

Here, a transmission timing of uplink transmission frame i is determined based on a downlink reception timing at a UE according to the following Equation 1.

In Equation 1 $N_{TA,offset}$ denotes a TA offset value occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time.

$$T_{TA}=(N_{TA}+N_{TA,offset})T_c \quad \text{[Equation 1]}$$

Figure 2:
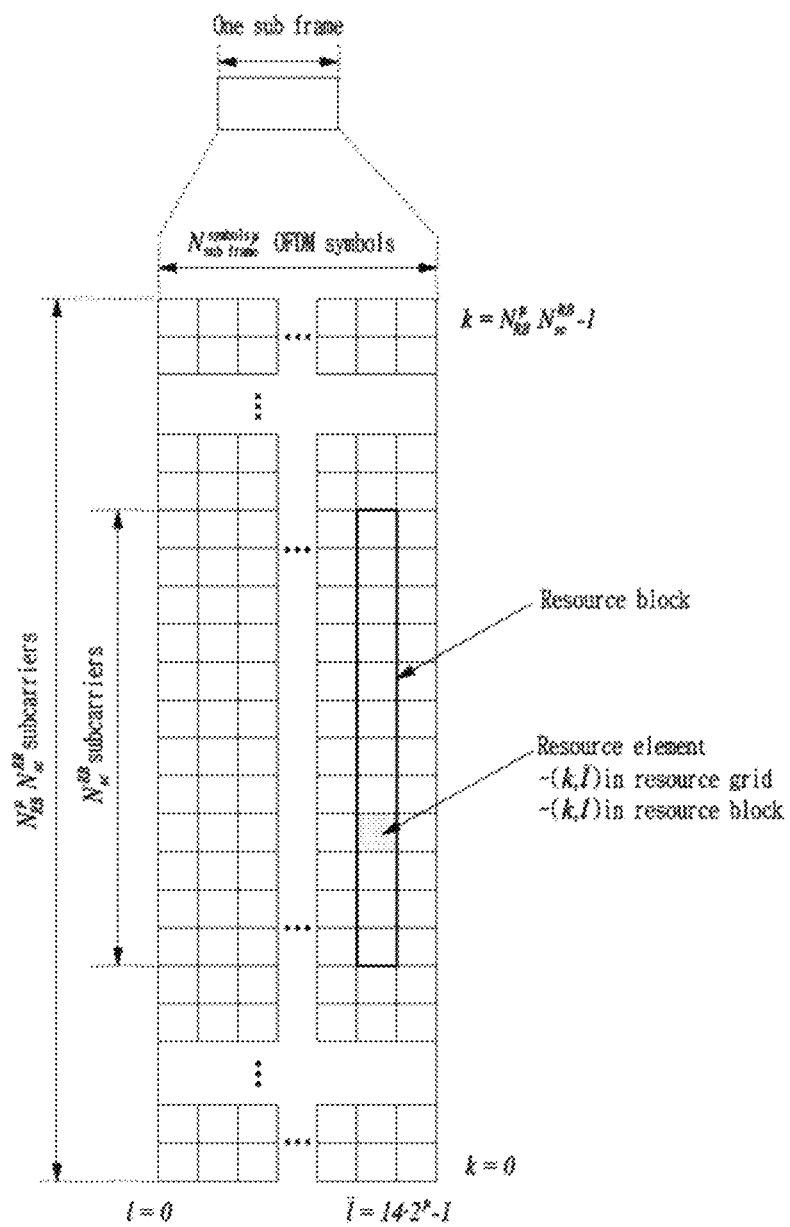
FIG. 2 illustrates an example of a resource grid and a resource block according to the present disclosure.

FIG. 2 illustrates an example of a resource grid and a resource block.

Referring to FIG. 2, a resource element within a resource grid may be indexed based on each subcarrier spacing. Here, a single resource grid may be generated for each antenna port and for each subcarrier spacing. Uplink/downlink transmission and reception may be performed based on a corresponding resource grid.

A single resource block may be configured on a frequency domain using 12 resource elements and may configure an index $n_{PRB}$ for a single resource block every 12 resource elements as represented by the following Equation 2. An index of the resource block may be used in a specific frequency band or system bandwidth.

$$n_{PRB} = \left[\frac{k}{N_{sc}^{RB}}\right] \quad \text{[Equation 2]}$$

Example Numerologies

Numerologies may be variously configured to meet various services and requirements of the NR system. Also, referring to the following Table 1, the numerologies may be defined based on an SCS, a cyclic prefix (CP) length, and a number of OFDM symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

Also, for example, referring to the following Table 1, if $\mu=2$ and SCS=60 kHz, a normal CP and an extended CP may be applied. In other bands, only the normal CP may be applied.

TABLE 1

| $\mu$ | $\Delta f = 2^\mu \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to $\mu=1$ and 2 may be used in the unlicensed band of 6 GHz or less and an SCS corresponding to $\mu=3$ and 4 may be used in the unlicensed band above 6 GHz. Here, for example, if $\mu=4$, it may be used only exclusive for a synchronization signal block (SSB), which is described below. However, it is provided as an example only and the present disclosure is not limited thereto.

Also, Table 2 shows a number $N_{slot}^{symb,\mu}$ of OFDM symbols per slot for each SCS setting. Table 2 shows a number of OFDM symbols per slot according to each SCS value, a number of slots per frame, and a number of slots per subframe, as provided by Table 1. Here, in Table 2, the values are based on the normal slot having 14 OFDM symbols.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Also, as described above, if $\mu=2$ and SCS=60 kHz, the extended CP may be applied. In Table 3, in the case of the extended CP, each value may be indicated based on the normal slot of which the number of OFDM symbols per slot $N_{slot}^{symb,\mu}$ is 12. Here, Table 3 shows the number of symbols per slot, the number of slots per frame, and the number of slots per subframe in the case of the extended CP that follows the SCS of 60 kHz.

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Hereinafter, a structure of an SSB/Physical Broadcast Channel (PBCH) in the NR system and an initial cell access structure in the NR system are described.

Here, an NR base station (i.e., gNB) may periodically transmit signals and channels as shown in the following Table 4 to allow an initial cell selection of UEs in a cell.

TABLE 4

SS/PBCH block (i.e. SSB)
SIB1(System Information Block 1)
Other SIBs

For example, the SS/PBCH block may be the aforementioned SSB. Here, even in the NR system, a UE may need to receive a broadcast channel for forwarding a synchronization signal and important system information transmitted from a corresponding wireless access system to perform an initial wireless access. To this end, the UE may check receiving sensitivity of a synchronization signal to discover an optical cell present in a most excellent channel environment. The UE may perform a frequency/time synchronization and cell identification operation for performing an initial access to an optimal channel among one or more channels in a specific frequency band operated based on the checked receiving sensitivity. The UE may verify a boundary of OFDM symbol timing through the aforementioned operation and then may initiate a PBCH demodulation in the same SSB.

Here, the UE may receive a PBCH demodulation reference signal (DMRS) and may perform a PBCH demodulation. Also, the UE may acquire 3-least significant bit (LSB) information from SSB index information bits through the PBCH DMRS. The UE may acquire information included in a PBCH payload by performing the PBCH demodulation. The UE may perform a procedure of demodulating SIB 1 based on the information acquired through the PBCH.

For example, in the NR system, the UE may receive remaining system information (RMSI) through a broadcast signal or channel as system information not transmitted from the PBCH. Also, the UE may receive other system information (OSI) and a paging channel through a broadcast signal or channel as other additional system information.

The UE may access a base station through a random access channel (RACH) process and then perform a mobility management.

Also, for example, when the UE receives an SSB, the UE needs to set an SSB composition and an SS burst set composition.

Example NR V2X Services

In association with a V2X service, the existing V2X service may support a set of basic requirements for V2X services. Here, the requirements are designed basically in sufficient consideration of a road safety service. Therefore, V2X UEs may exchange autonomous status information through a sidelink and may exchange the information with infrastructure nodes and/or pedestrians.

Meanwhile, in a further evolved service (e.g., LTE Rel-15) as the V2X service, new features are introduced by considering a carrier aggregation in a sidelink, a high order modulation, a latency reduction, a transmit (Tx) diversity, and feasibility for sTTI. Coexistence with V2X UEs (the same resource pool) is required based on the aforementioned description, and the services are provided based on LTE.

For example, technical features may be classified largely based on four categories as represented by the following Table 5 by considering use cases for supporting a new V2X service as system aspect (SA) 1. Here, in Table 5, "Vehicles Platooning" may be technology that enables a plurality of vehicles to dynamically form a group and similarly operate. Also, "Extended Sensors" may be technology that enables exchange of data gathered from sensors or video images. Also, "Advanced Driving" may be technology that enables a vehicle to drive based on semi-automation or full-automation. Also, "Remote Driving" may be technology for remotely controlling a vehicle and technology for providing an application. Based thereon, further description related thereto may be given by the following Table 5.

TABLE 5

Vehicles Platooning

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.
Extended Sensor Extended Sensor enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
Advanced Driving Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.
Remote Driving Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Also, the above SA1 may consider all of LTE and NR as enhanced V2X (eV2X) support technology for supporting the new V2X service. For example, an NR V2X system may be a first V2X system. Also, an LTE V2X system may be a second V2X system. That is, the NR V2X system and the LTE V2X system may be different V2X systems. In the following, description is made based on a method of satisfying low latency and high reliability required in an NR sidelink based on the NR V2X system. Here, even in the LTE V2X system, the same or similar composition may be expanded and thereby apply. However, it is provided as an example only and the present disclosure is not limited thereto. That is, even in the LTE V2X system, the present disclosure may apply to an interactable portion and is not limited to the following example. Here, for example, NR V2X capability may not be limited to essentially support only V2X services and V2X RaT to be used may be selected.

Example NR Sidelink Frequency

An NR sidelink basically considers all of FR1 and FR2 (i.e., up to 52.6 GHz) unlicensed ITS bands and licensed ITS bands. Therefore, a common design method for supporting a corresponding frequency band is preferred. Therefore, similar to an NR standard design, an NR sidelink design capable of basically supporting beam-based transmission and reception may be required even in an omni-directional Tx/Rx case not a beam-based case. Also, terms used herein may be defined as the following Table 6.

TABLE 6

UMTS (Universal Mobile Telecommunications System):

refers to 3rd Generation (3G) mobile communication technology based on Global System for Mobile Communication (GSM), developed by 3GPP
EPS (Evolved Packet System):

refers to a network system that includes an Evolved Packet Core (EPC) that is a packed switched (PS) core network based on an Internet protocol (IP) and an access network such as LTE/Universal Terrestrial Radio Access Network (UTRAN). A network evolved from Universal Mobile Telephone System (UMTS).
NodeB:

refers to a base station of GERAN/UTRAN and is installed outdoors and has coverage of macro cell scale.
eNodeB:

refers to a base station of E-UTRAN and is installed outdoors and has coverage of macro cell scale.
gNodeB:

refers to a base station of NR and is installed outdoors and has coverage of macro cell scale.
UE (User Equipment):

refers to a user equipment. The UE may also be interchangeably used with terms, terminal, mobile equipment (ME), mobile station (MS), and the like. Also, the UE may be a portable device, such as a laptop computer, a mobile phone, a personal digital assistant (PDA), a smartphone, a multimedia device, etc. The term "UE" or "terminal" in Machine Type Communications (MTC) related content may refer to an MTC device.
RAN (Radio Access Network):

refers to a unit that includes NodeB, eNodeB, and gNodeB, and a radio network controller (RNC) for controlling the same in a 3GPP network, and is present between UEs and provides a connectivity to a core network.
NG-RAN (Next Generation Radio Access Network):

refers to ng-eNB (E-UTRA UP/CP protocol) and gNB (NR UP/CP protocol) base station nodes connected to 5GC (5G Core NW) based on an NG interface in a 3GPP network.

TABLE 6-continued

Xn interface:

refers to an interface for interconnection between NG-eNG and gNB.
PLMN (Public Land Mobile Network):

refers to a network configured to provide a mobile communication service to individuals, and may be configured for each operator.
Proximity service (or ProSe Service or Proximity based Service):

refers to a service that enables discovery and direct communication between physically proximate apparatuses, communication through a base station, or communication through a third apparatus. Here, user plane data is exchanged through a direct data path without going through a 3GPP core network (e.g., EPC).
LTE SFN (System Frame Number):

refers to a frame index for time domain reference of LTE.
NR SFN (System Frame Number):

refers to a frame index for time domain reference of NR.
NR DFN (Direct Frame Number):

refers to a frame index for time domain reference of an NR sidelink.

Herein, the NR V2X sidelink design to meet the requirements for the newly evolved V2X (i.e., eV2X) services is described. In particular, a synchronization procedure and method required to form a radio link for an NR sidelink are provided in detail. Here, it is assumed that an NR sidelink frequency for NR sidelink operation is designed by considering all of FR1 and FR2 (i.e., up to 52.6 GHz) unlicensed ITS bands and licensed ITS bands, and frequency bands and range operated by the NR system, and it is assumed that the NR sidelink frequency needs to be applicable as a common design in all of FR1 and FR2. Also, the availability of LTE (ng-eNB)/NR Uu link that is the aforementioned 3GPP NG-RAN needs to be considered for NR V2X sidelink transmission and reception procedures.

A design for eV2X synchronization information transmission and signal transmission and reception to meet higher requirements from the newly evolved V2X services needs to be considered. In the case of a frequency for the aforementioned NR V2X SL communication, many schemes, such as, for example, a scalable frequency use and configuration (e.g., bandwidth part (BWP)), various numerologies (e.g., variable SCSs, a number of OFDM symbols per a slot (or subframe)), and a slot format (slot/non-slot) according to a new wideband frequency band and a maximum bandwidth capability of a UE, a beam-based transmission and reception for coping with a signal attenuation in a frequency band of 60 GHz or more corresponding to a high frequency band, a configured grant-based uplink transmission and reception for providing a lower latency, and the like, are introduced in Rel-15, which differs from the existing LTE. By effectively applying the NR V2X sidelink based on the aforementioned various Rel-15 NR radio access technologies, particularly, uplink transmission related technologies, the new V2X service requirements need to be met.

NR V2X sidelink physical channel and signal, and basic slot structure and physical resources:
NR PSSCH (Physical Sidelink Shared Channel):
Physical layer NR SL data channel
NR PSCCH (Physical Sidelink Control Channel):
Physical layer NR SL control channel, that is, a channel for forwarding control information as well as scheduling information of an NR SL data channel. A transmitting UE transmits the NR PSCCH to a receiving UE at a time of or before transmitting the NR PSSCH.

NR PSHICH (Physical Sidelink HARQ-feedback Indicator Channel):
Physical layer NR HARQ-feedback channel, that is, a channel for forwarding Channel State Information (CSI) as well as HARQ-ACK feedback information corresponding to the NR SL data channel.
NR SLSS/PSBCH block:
Synchronization and broadcast channel block in which an NR SL synchronization signal and broadcast channel are transmitted on a single continuous time in a physical layer. To support a beam-based transmission on an NR frequency band, transmission may be periodically performed based on a set of one or more block indices. A synchronization signal may include a primary sidelink synchronization signal (PSSS) and a secondary sidelink synchronization signal (SSSS) and a sequence for a corresponding signal may be generated based on at least one SLSSID value. A Physical Sidelink Broadcast Channel (PSBCH) is transmitted with an SLSS to forward system information required to perform V2X SL communication. Likewise, the PSBCH is periodically transmitted in a form of a set of SLSS/PSBCH block indices to support beam-based transmission.

In an NR V2X sidelink network scheduling mode, an NR Physical Downlink Control Channel (PDCCH) transmitted to a downlink through NR Uu (a radio link between gNB and UE) or ng-eNB Uu (a radio link between ng-eNB and UE) refers to a channel transmitted from the base station to the UE to forward an NR V2X DCI format that is defined to forward V2X scheduling and control information.

Figure 3:
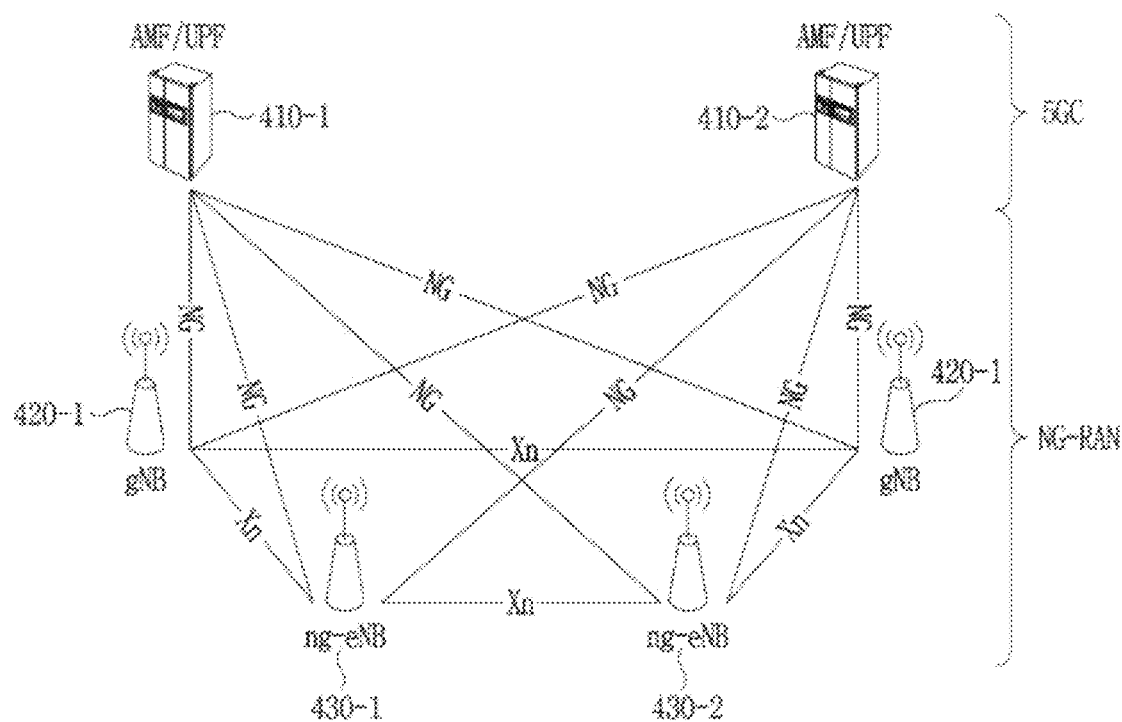
FIG. 3 illustrates a basic network architecture configuration and deployment scenario based on a new radio (NR) vehicle-to-everything (V2X) sidelink.

Here, for example, FIG. 3 illustrates an example of a basic network architecture configuration and deployment scenarios considered for an NR V2X sidelink.

For example, referring to FIG. 3, NG interfaces may be set between nodes 410-1 and 410-2 of a 5-th generation core (5GC NW) and nodes 420-1, 420-2, 430-1, and 430-2 of an NG-RAN. Also, Xn interfaces may be set between the nodes 420-1, 420-2, 430-1, and 430-2 of the NG-RAN. Here, in the above architecture, corresponding nodes may be interconnected through the corresponding Xn interface based on gNB (NR UP/CP protocol) corresponding to the nodes 420-1 and 420-2 and NG-eNB (E-UTRA UP/CP protocol) corresponding to the nodes 430-1 and 430-2, which constitute the NG-RAN. Also, as described above, in the 5GC, corresponding nodes may be interconnected through a corresponding NG interface. Here, for example, in the above architecture, all of an LTE sidelink UE and an NR sidelink UE may be controlled by the NG-RAN (i.e., LTE Uu and NR Uu) based on the gNBs and NG-eNBs. Therefore, when transmitting synchronization information, the NR sidelink UE may receive synchronization information from the LTE Uu or NR Uu link, and may transmit NR sidelink synchronization information (e.g., SL synchronization signal/SL Physical Broadcast Channel (PBCH)) based on the received synchronization information. However, it is provided as an example only and the present disclosure is not limited thereto. That is, the NR sidelink UE may also acquire the synchronization information through the LTE Uu link as well as the NR Uu link.

Meanwhile, with respect to V2X sidelink communication, V2X sidelink UEs may perform the V2X sidelink communication. Here, predetermined conditions need to be met such that the V2X sidelink UEs may start the communication. The conditions may be represented by the following Table 7. That is, a V2X sidelink UE may perform V2X sidelink communication in an RRC idle mode, inactive mode, or connected mode. Also, V2X sidelink UEs that perform the V2X sidelink communication need to be registered on a selected cell on a using frequency or need to belong to the same Public Land Mobile Network (PLMN). Also, if a V2X sidelink UE is an OOC on a frequency for V2X sidelink communication, the V2X sidelink UE may perform the V2X sidelink communication only when it is possible to perform the V2X sidelink communication based on pre-configuration.

TABLE 7

If a UE is in an RRC_IDLE or INACTIVE or CONNECTED mode in a specific cell,
If a UE is registered to a selected cell on a frequency used for V2X SL communication or belongs to the same PLMN,
If a UE is an OCC on a frequency for a V2X SL communication operation, and if a UE is capable of performing V2X SL communication based on pre-configuration Here, as described above, to start the V2X sidelink communication, sidelink synchronization information may be required. Therefore, the UE needs to transmit the sidelink synchronization information. Here, a transmitting UE (sidelink Tx UE) may receive a configuration for transmitting sidelink synchronization information prior to transmitting corresponding synchronization information. Here, for example, the transmitting UE may receive the configuration for transmitting the sidelink synchronization information based on a system information message or an RRC reconfiguration message (in the case of an RRC CONNECTED UE) broadcasted from the above NG-RAN nodes. Also, for example, if an NR V2X sidelink UE (hereinafter, referred to as a UE) is absent in an NG-RAN, the UE may transmit sidelink synchronization information based on the pre-configured information, which is described above.

Example NR V2X Deployment Scenarios

Figure 4:
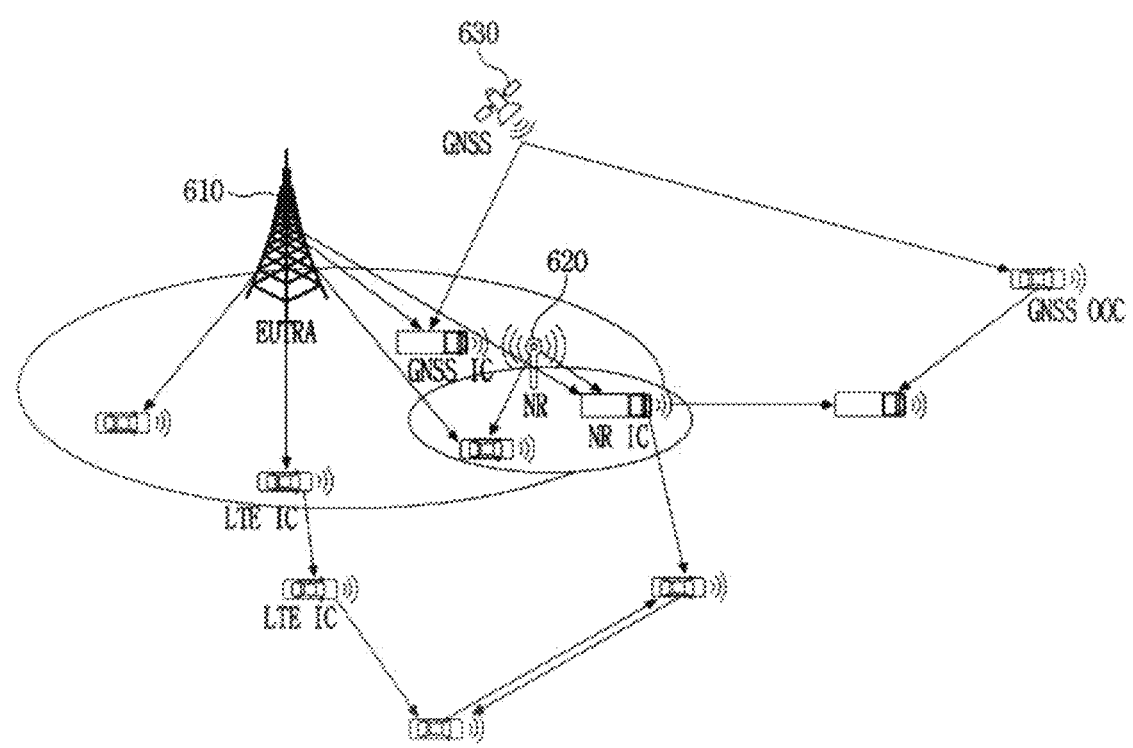
FIG. 4 illustrates a scenario in which NR V2X sidelink communication is performed 3rd Generation Partnership Project (3GPP) based on the aforementioned description.

Meanwhile, FIG. 4 illustrates an example of a scenario in which NR V2X sidelink communication is performed in a 3GPP network based on the aforementioned description. Here, the NR V2X sidelink communication may be performed on the 3GPP network (hereinafter, NG-RAN). Additionally, presence of a Global Navigation Satellite System (GNSS) signal may be considered.

In detail, referring to FIG. 4, each of NR V2X sidelink UEs may be an IC or an OOC based on NG-eNB 610, may also be an IC or an OOC based on gNB 620, and may also be an IC or an OOC based on GNSS 630. Here, NR V2X sidelink UEs may select a resource of synchronization reference based on a location and capability of a UE. Also, for example, in addition to the scenario of FIG. 4, scenarios shown in the following Table 8 may be considered. It is provided as an example only and the present disclosure is not limited thereto.

TABLE 8

NR Uu CONNECTED/IDLE/Inactive for NR Sidelink
NG-eNB Uu CONNECTED/IDLE for NR Sidelink
EN-DC or MR-DC for NR Sidelink Herein, proposed is a method of providing HARQ-feedback about data transmission related to unicast/groupcast considered to perform NR V2X sidelink communication.

In a physical layer, it is basically assumed that whether to activate the unicast/groupcast or broadcast data transmission and reception is determined and indicated in an upper layer. In particular, with respect to unicast or groupcast, it may be assumed that a UE may perform corresponding transmission and reception after a session for corresponding unicast/groupcast data transmission is generated.

Also, in the physical layer, it is assumed that physical layer parameter information for data transmission corresponding to unicast or groupcast is known. The corresponding parameter information is assumed to include at least one ID value as follows:

NR V2X ID candidates:
Groupcast: destination group ID, source ID
Unicast: destination ID, source ID
HARQ process ID In general, unicast or groupcast data transmission and reception may consider scenarios in which a relatively small number of V2X UEs are present around a Tx V2X UE and a session for stable unicast or groupcast data transmission is maintainable. Otherwise, it is assumed that broadcast data transmission is generally performed.

In general, data allocable to unicast or groupcast transmission and reception generated in an application layer has no direct mapping relation with a radio layer. However, to perform data transmission and reception on a radio layer, such as the unicast or groupcast transmission and reception, a corresponding mapping relation or connection establishment procedure is expected to be required.

Also, to perform at least unicast data transmission and reception, a mutual session needs to be established in such a manner that corresponding Tx and Rx UEs perform a procedure (e.g., discovery procedure) of discovering presence of an adjacent UE. The procedure may be performed using a variety of methods.

As a first method, the method may be performed with assistance from a base station. The base station may gather location information of UEs, may determine whether UEs capable of performing unicast or groupcast data transmission and reception are close to each other, and, if the UEs are determined to be close to each other, may initialize a corresponding discovery procedure such that the UEs may perform an operation of determining whether the UEs are mutually present around. Alternatively, Whether an adjacent V2X UE is present may be determined by designing a new discovery channel and by periodically transmitting and receiving the corresponding channel. Alternatively, Whether an adjacent UE is present may be determined by transmitting and receiving a corresponding discovery message using a V2X data channel.

Session establishment for unicast or groupcast data transmission and reception is completed based on the aforementioned procedures and assumptions.

The upper layer notifies the physical layer of the information and then performs a physical layer operation, such as HARQ-ACK, CSI, and link adaptation. Herein, particularly, proposed are a timing determination method for transmitting a corresponding channel with the assumption of a PSHICH for forwarding HARQ-ACK feedback, and a corresponding resource selection method are described.

Example Time Domain Allocation Schemes for NR SL HARQ Operation

An NG-RAN (i.e., gNB or ng-eNB) may perform scheduling for NR SL V2X data transmission. Here, a DCI format used to forward such NR V2X scheduling information may be DCI format 3. The DCI format 3 is provided from an NG-RAN base station to a Tx UE in a cell through a PDCCH. Unless indicated otherwise, the following DCI format corresponds to the DCI format 3. In an NR V2X system, a different DCI format and/or a different RNTI value may be defined/determined based on various data traffic types (e.g., unicast/groupcast) and transmission methods (e.g., SL multiple input multiple output (MIMO) transmission) in a mode of performing data transmission and reception on an SL according to base station scheduling and may be used in a physical layer to indicate each of the traffic types and transmission methods. The following example may apply:

DCI format 3_0 for single layer Tx (SL 1 TB transmission)
DCI format 3_1 for SL MIMO Tx (SL 2 TB transmission)
DCI format 3_0 scrambled by broadcast ID for broadcast
DCI format 3_1 scrambled by groupcast ID for unicast
DCI format 3_0 scrambled by unicast ID for groupcast Different DCI field values may be configured based on the respective transmission schemes and purposes by defining the above DCI formats. In the following, new DCI fields and sidelink control information (SCI) format field values corresponding thereto may be provided through time domain allocation schemes for the NR V2X HARQ operation proposed herein. Also, the SCI format is included in a PSCCH that provides scheduling of a data channel (i.e., PSSCH) on an NR SL and related control information and thereby transmitted.

Example SL Physical Resource Allocation Mode for NR V2X SL Communication

Similar to the LTE V2X system, a network scheduling mode (e.g., mode 1) in which a base station performs resource configuration and scheduling and a non-network scheduling mode (e.g., mode 2) that is a mode in which a Tx UE itself finally determines resources without network scheduling may be present in an NR V2X system. A potentially different NR V2X SL HARQ method may be considered based on a corresponding transmission mode.

Basically, similar to a Physical Uplink Control Channel (PUCCH) on an NR Uu link, transmission of a PSHICH is performed by indicating or selecting a specific resource. A resource capable of transmitting the PSHICH may be performed on a single physical resource block (PRB) or a plurality of PRBs. Here, it is assumed that a plurality of UEs may be multiplexed based on different codes or spatial information on the same physical resource based on a PSHICH transmission format.

For SL physical resource allocation, NR-V2X SL communication may consider the following methods:

Mode 1: refers to a mode in which a base station schedules SL physical resources for NR V2X SL communication. Here, the base station may be a 3GPP NG-RAN and may be gNB or ng-eNB. To directly control the NR V2X SL communication within base station coverage based on an SL resource allocation request received from each UE, the base station directly performs data scheduling on SL physical resources for corresponding transmission to a Tx UE using a PDCCH (a DCI format for NR V2X SL).

Mode 2: refers to a mode in which a UE directly selects and uses an SL physical resource within pre-configured resources or resources configured by the base station (without scheduling of the base station). Mode 2 may have the following sub-modes.

2-1: refers to a mode in which the UE automatically selects an SL physical resource. In mode 2-1, the UE directly determines a resource by autonomously sensing a necessary resource and performs NR V2X SL communication.

2-2: refers to a mode in which the UE may assist other UEs to select SL physical resources. A single representative UE may provide guide or information required to schedule resources for NR V2X SL communication of other UEs and may assist other Tx UEs to perform a resource selection.

2-3: refers to a mode in which the UE performs SL transmission on a preconfigured SL physical resource. In this mode, the UE performs SL transmission of the pre-configured physical resource or among SL physical resources indicated through a broadcast or dedicated RRC message from the base station.

2-4: refers to a mode in which the UE schedules SL physical resources of other UEs. In this mode, almost similar to the base station, a specific UE performs scheduling of SL physical resources of other Tx UEs.

Various time resource allocation schemes and indication methods for supporting an SL HARQ operation on a time domain based on various SL transmission modes as above may be provided as follows.

In mode 1 and some sub-modes (e.g., 2-2 or 2-4) of mode 2, indication for at least four timings may be requested to SL data Tx/Rx UEs as follows. In mode 2, timing A is not considered. Each of the following timings may be indicated through a DCI format transmitted through an NG-RAN, indicated through an SCI format transmitted from a Tx UE, or determined by an Rx UE through an implicit method depending on the following proposed methods.

Timing A: PDCCH→PSCCH and/or PSSCH for mode 1
Timing A-1: S_PSCCH and/or S_PSSCH (scheduling or assist PSCCH/PSSCH)→PSCCH and/or PSSCH for other UE(s). Timing A-1 may be considered in a non-network scheduling mode, particularly, modes 2-2 and 2-4, not in a network scheduling mode. For example, in mode 2-2, a time difference or a timing between an S_PSCCH and/or S_PSSCH transmitted from a specific UE assisting resource selection of a Tx UE and a PSCCH/PSSCH transmitted from the Tx UE may be regarded as timing A-1.
Timing B: PSCCH and/or PSSCH→PSHICH. Timing B corresponds to a HARQ-ACK feedback timing as a timing considered in all of modes 1 and 2 for unicast/groupcast transmission. This timing is used for an Rx UE to transmit HARQ-ACK feedback (i.e., PSHICH). It is a perspective from the Rx UE.
Timing B-1: PSCCH and/or PSSCH→PSHICH #0, PSHICH #1, . . . , PSHICH #N−1 for groupcast (N UEs within a group). As a specific case of timing B, when groupcast data is received at a plurality of Rx UEs from a single Tx UE, it may be defined to independently determine each of PSHICH transmission timings (i.e., timing B-1) of the plurality of Rx UEs.
Timing C: PSHICH→ReTx PSCCH and/or PSSCH. A timing relation between a PSHICH (HARQ-ACK feedback) received at a Tx UE and subsequent data retransmission is defined from perspective of the Tx UE.
Timing D: Initial PSCCH and/or PSSCH→ReTx PSCCH and/or PSSCH. A timing relation between initial PSCCH/PSSCH transmission and subsequent retransmission is defined from perspective of a Tx UE. A timing relation between retransmissions may apply alike.

All of the above four timings refer to a timing between associated channels and may be determined using "slot offset number (K)" and/or "start OFDM symbol (S) and allocation length (L, a number of symbols)". For example, in the case of timing A, the Tx UE may receive a PDCCH in a slot n from the base station and then may perform PSCCH and/or PSSCH transmission by the symbol length (L) indicated by starting (S) a specific OFDM symbol behind K (slot offset) slots.

Hereinafter, unicast/groupcast data transmission that requires HARQ-feedback transmission is described from perspective of a single HARQ process. For example, UEs do not assume that all of PSCCH/PSSCH and PHICH transmission corresponding to HARQ process #1 may be performed after PSCCH/PSSCH transmission corresponding to HARQ process #0.

In an NR Uu link, a maximum Rx-to-Tx switching time is defined as 13 us in FR1 and jus in FR2. The same time value may be reused by an NR SL UE. Therefore, in general, a single OFDM symbol duration is sufficient for an Rx-to-Tx switching time. On the contrary, referring to NR V2X requirements from current SA1, required maximum communication range is about 1000 m. Therefore, 6.66 us is required for a round trip time. If SCS=60 kHz, a single OFDM symbol length is 17.84 us (normal cyclic prefix (CP)). Therefore, 13 us+6.66 us=19.66 us (FR1) may be required as GP. Since a single OFDM symbol length is 17.84 us for 60 kHz SCS, the above time length may require at least two OFDM symbols for the GP. Therefore, at least one OFDM symbol may be used as the GP depending on an associated configuration or scenario. Therefore, one or two OFDM symbols are assumed herein as the Rx-to-Tx switching time to support all of the aforementioned scenarios and configurations. The following FIG. 6 assumes a single OFDM symbol for the Rx-to-Tx switching time.

A portion of or all of DCI/SCI field values proposed in the following respective methods and examples may be present together in a DCI format or an SCI format. For example, corresponding fields proposed in time domain allocation scheme 1 and all of the field values for new type SL-data and new type HARQ feedback transmission are present together in the DCI format or, if necessary, in the SCI format. Therefore, the present disclosure may consider the DCI format or the SCI format field values required for each time resource allocation scheme and transmission scheme, and assumes that, if at least one proposed method is used for NR V2X, all of the DCI format/SCI format fields associated with the methods are present together.

Hereinafter, each of the proposed methods is described based on mode 1 that is a network scheduling mode. However, even in mode 2 (modes 2-1/2/3/4) that is a non-network scheduling mode, an operation between Tx and Rx UEs excluding DCI signaling (e.g., timing A) by the base station is assumed to apply alike. For example, in the following proposed methods, information for PSCCH transmission and PSSCH/PSHICH transmission and reception including the SCI format, excluding information provided in the DCI and timing A may apply in mode 2.

Example Time Domain Allocation Scheme 1

Figure 5:
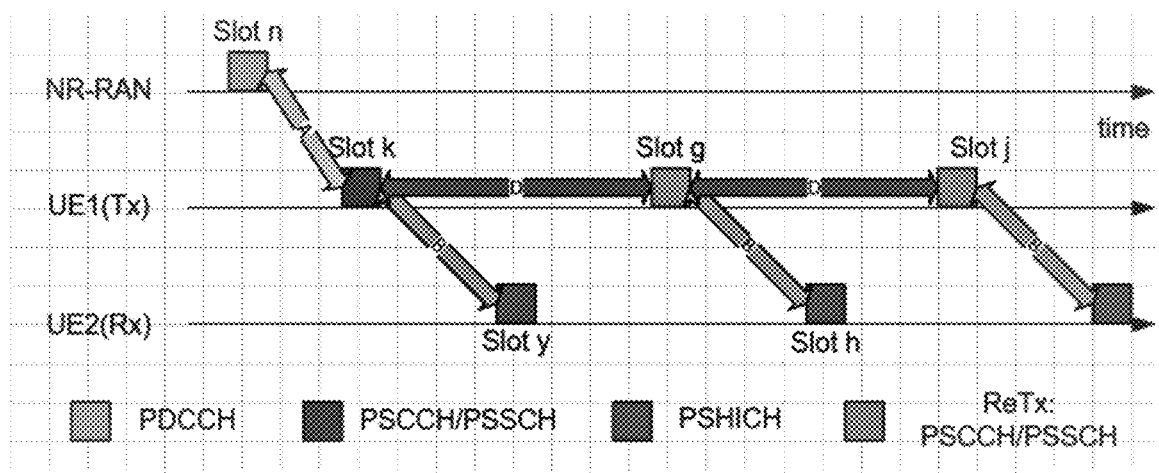
FIG. 5 illustrates an example of a time domain allocation scheme.

FIG. 5 illustrates an example of time domain allocation scheme 1. Here, a signaling scheme and a Tx node used to indicate information about the above discussed four timings or whether an Rx node directly selects the information may be applied with the following detailed signaling options. As described above, in a non-network scheduling mode (i.e., mode 2), at least timing A is absent. Therefore, at least timings B, C (described in the following example), and D may be defined in the non-network scheduling mode.

Alt 1-1:
Timings A, B, and D are provided from a base station to a Tx UE through a DCI field,
The Tx UE (UE1) indicates to an Rx UE information about the timing B indicated by the base station through the DCI field through an SCI field (PSCCH).
Or,
Alt 1-2:
Timings A and D are indicated by the base station to the Tx UE through the DCI field,
Timing B is autonomously determined by the Tx UE without indication from the base station and the corresponding information is indicated to the Rx UE through the SCI field (PSCCH).
Or,
Alt 1-3:
Timings A and B are provided from the base station to the Tx UE through the DCI field,
The Tx UE (UE1) indicates to the Rx UE information about the indicated timing B through the SCI field (PSCCH), and timing D is configured for the Tx UE by an upper layer (RRC or MAC) according to signaling of the base station or indicated through a pre-configuration value unless it is a base station scheduling mode.
Or,
Alt 1-4:
Timing A is indicated by the base station to the Tx UE through the DCI field,
Timing B is autonomously determined by the Tx UE and the Tx UE indicates the information to the Rx UE through an SCI field (PSCCH),
Timing D is configured for the Tx UE by an upper layer (RRC or MAC) according to signaling of the base station or indicated through a pre-configuration value unless it is a base station scheduling mode.

Each of the detailed methods may use one or at least a portion of options depending on a degree of involvement used for the base station or the Tx UE to determine resources on a time domain to perform SL data transmission and reception between NR V2X UEs.

Figure 6:
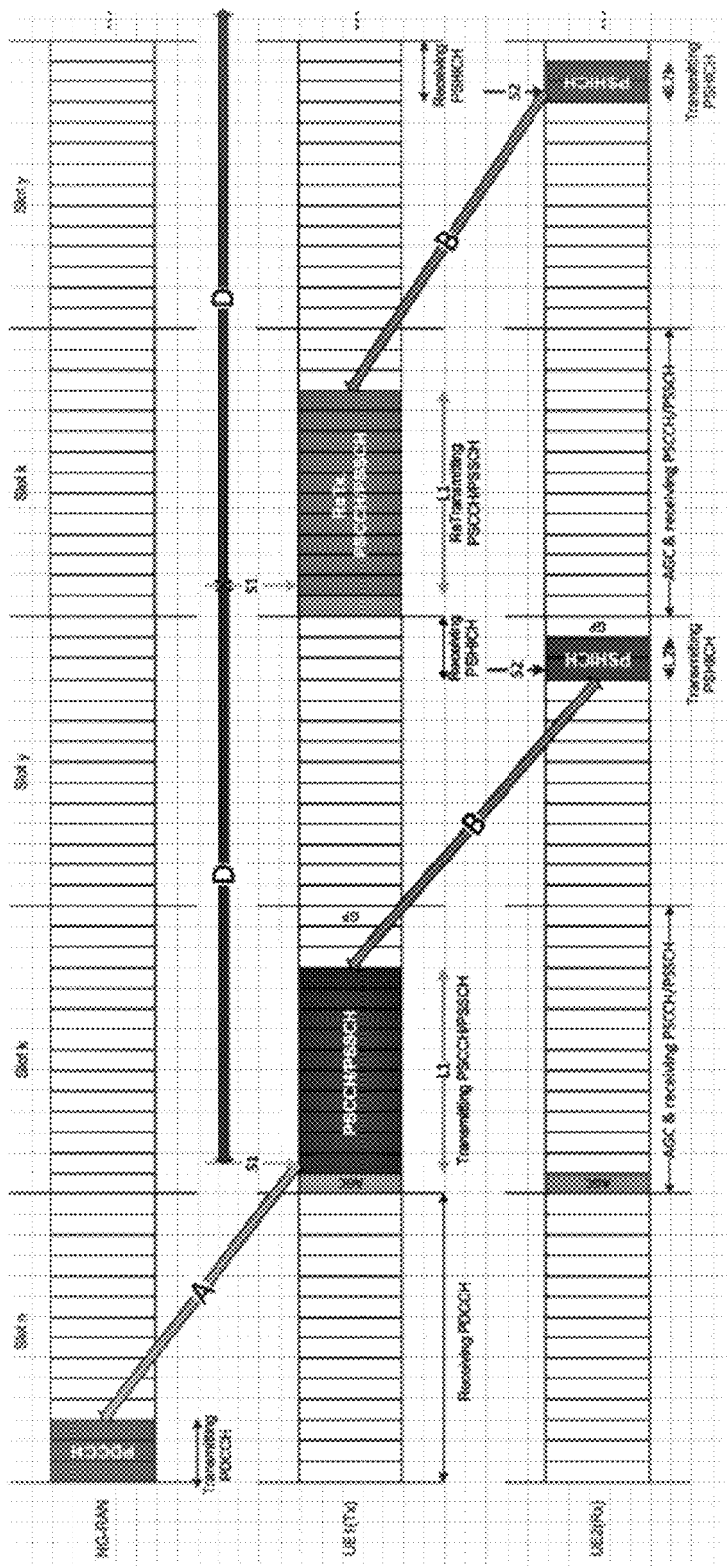
FIG. 6 illustrates an example of a time domain allocation scheme.

For example, FIG. 6 illustrates an example of a further detailed required parameter, field value, and operation method based on the aforementioned time domain allocation scheme 1.

Example DCI/SCI Format Fields for NR V2X HARQ Operation

A portion of or all of information included in new DCI format fields described in the following proposed methods may be provided to an Rx UE through an SCI format field in a PSCCH transmitted from a Tx UE.

dci-to-pscch/pssch timing indicator: a DCI field for indicating timing A. Based on a corresponding field value, the following time allocation related information for PSCCH/PSSCH transmission is provided.
slot offset: a number of slots between a PDCCH (DCI) and a PSCCH/PSSCH
{1, . . . , 3}
S1: a start OFDM symbol index for PSCCH/PSSCH transmission
{0, . . . , 13}
L1: a number of OFDM symbols for PSCCH/PSSCH transmission
{1, . . . 14} or {4, . . . , 14}
pscch/pssch-to-HARQ feedback timing indicator: a DCI field for indicating timing B. Based on a corresponding field value, the following time allocation related parameter information for PSHICH transmission is provided.

In particular, the information is included in an SCI field (PSCCH) and provided from a UE1 to a UE2. Therefore, the UE2 (Rx) may receive the corresponding SCI field included in at least the PSCCH and then may acquire time allocation information for PSHICH transmission.

It is assumed that ID values corresponding to group-destination-ID and Source-ID used in the aforementioned physical layer are provided to the physical layer by performing a corresponding unicast/groupcast session establishment procedure through an upper layer for unicast/groupcast NR V2X data transmission and reception. Therefore, ID values provided herein are already indicated to the physical layer through the unicast/groupcast session establishment procedure in the upper layer between the Tx and Rx UEs and are considered to be used for the subsequent HARQ operation. The considered upper layer may be an RRC layer or a MAC layer.

SCI format field: included in the SCI field based on a DCI field value and transmitted to the Rx UE through the PSCCH transmitted from the Tx UE.

slot offset: a number of slots between the PSCCH/PSSCH and the PSHICH
{1, . . . , 3}

PSHICH format/resource indicator: If at least one PSHICH transmission format is defined, the corresponding indicator may be indicated to the Tx UE through the DCI field and then provided to the Rx UE through the SCI field in the PSCCH transmitted from the Tx UE. Therefore, a PSHICH transmission method may be determined based on a PSHICH format/resource that is indicated. For example, a PSHICH format using only one or two OFDM symbols or a PSHICH format using 3 to 14 OFDM symbols may be introduced. Here, one format thereof may be indicated and the PSHICH transmission may be performed. Therefore, the PSHICH format and resource may be provided to the Rx UE through the DCI/SCI field and configuration information (e.g., information about at least one of S2, L2, start PRB index, a number of PRBs, an initial cyclic shift (CS) value, and a time domain OCC value as follows) for determining the indicated PSHICH format and resource may be provided in advance based on base station RRC signaling (in-coverage) or pre-configuration (out-of-coverage). Alternatively, the base station or the Tx UE may indicate a PSHICH resource index to other UEs using the DCI/SCI format based on correlation between a PSHICH resource index and format predefined in a standard and the configuration information (i.e., if a single resource index is indicated or determined by mapping a single PSHICH resource index to a single format, a single S2, a single L2 value, a single start PRB index, a single initial CS value, and a single OCC value, all of the mapped related information is indicated). In this manner, all the configuration information associated with the indicated resource index may be determined.

S2: a start OFDM symbol index for PSHICH transmission
{0, . . . , 13}

L2: a number of OFDM symbols for PSHICH transmission
{1, . . . 14} or {4, . . . , 14} start PRB index: a first PRB index for performing PSHICH transmission

PRB number: a number of PRBs in which PSHICH transmission is performed

Initial cyclic shift value: a CS value for PSHICH transmission. A different code resource is provided through this value.

Time domain OCC value: a time domain orthogonal code value for PSHICH transmission. A different code resource is provided based on this value.

Figure 7:
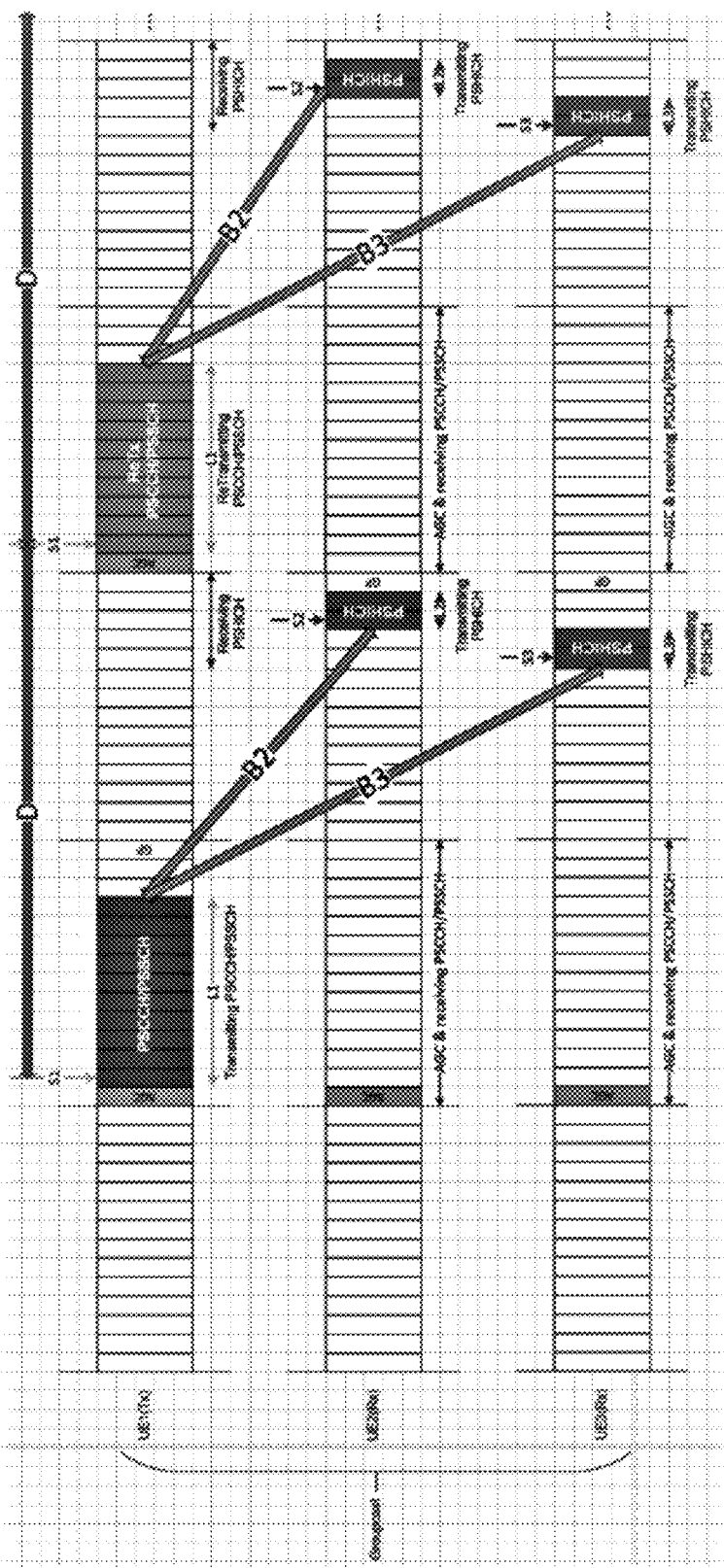
FIG. 7 illustrates an example of a time division multiplexing (TDM) based Hybrid Automatic Repeat Request (HARQ)-ACK feedback (PSHICH) transmission method for a plurality of receiving user equipments (UEs) in the case of groupcast transmission.

Also, in the case of groupcast transmission, the UE1 transmits SL data to a plurality of Rx UEs. Therefore, a corresponding HARQ-feedback timing may be indicated based on a combination of a group-destination-ID value and a Source-ID value of each Rx UE and an offset value. Alternatively, a different HARQ-feedback timing or PHISCH resource value may be indicated based on the Source-ID value of each Rx UE and the offset value as shown in FIG. 7. At least Tx and Rx UEs may share in advance the group-destination-ID, Source-ID, and offset values through the unicast/groupcast session establishment procedure. Thus, HARQ-feedback transmission with respect to data transmission from the Tx UE may be performed on an independent physical resource based on the ID and offset values. Alternatively, the Tx UE indicates to the plurality of Rx UEs one or more values corresponding to the pscch/pssch-to-HARQ feedback timing indicator and acquires indicator information corresponding to a corresponding Rx UE through the group-destination-ID and/or Source-ID values and uses the corresponding information. Alternatively, the Tx UE indicates to the plurality of Rx UEs a value corresponding to the PSHICH format/resource indicator and acquires indicator information corresponding to a corresponding Rx UE through the group-destination-ID and/or Source-ID and/or the offset values and uses the corresponding information. A resource index indicated by the PSHICH format/resource indicator is induced by each of the Rx UEs or indicated by the Tx UE through the aforementioned method such that the Rx UEs in the group to perform at least HARQ-ACK feedback may have different values.

FIG. 7 illustrates an example of a TDM-based HARQ-ACK feedback (PSHICH) transmission method for a plurality of Rx UEs in the case of groupcast transmission.

In the case of groupcast, information about parameters associated with the time domain resource allocation indicated through the SCI format, "slot offset", "PSHICH format indicator, start symbol (S2), length (L2)", start PRB index, PRB number, initial CS value, and time domain OCC value, may be determined as described above using the following.

a combination of a PSHICH resource offset (delta value), a group-destination-ID, and a Source-ID value of each Rx UE, or a PSHICH resource offset (delta value), a Source-ID value of each Rx UE, or only a Source-ID value of each Rx UE Based thereon, the information may be determined using a different HARQ-feedback timing (PSHICH time resource), PSHICH frequency resource index/PSHICH cyclic shift index, and the like.

For example, a start symbol (S2) value of the UE1 may be determined as {(group-destination-ID+Source-ID)mod Nsym}+delta value=S2. Here, Nsym denotes a number of OFDM symbols in a single slot. For example, UEs associated with a corresponding group have the same ID value based on a group-destination ID value and determine a time/frequency/code resource set (i.e., a PSHICH resource set) for PSHICH transmission based on the ID value. Each of the Rx UEs may receive an indication of or may determine a single PSHICH resource among a plurality of PSHICH resources configured in the determined PSHICH resource set based on the PSHICH resource offset (delta value), the Source-ID value of each Rx UE, and the like. Here, the PSHICH resource set is configured to include one or more PSHICH resources. Also, a plurality of PSHICH resource sets may be configured.

Referring to FIG. 7, after a groupcast session is generated, the UE1 is a Tx UE and the UE2 and the UE3 are Rx UEs. The UE1 performs data transmission corresponding to groupcast and UEs receiving the data perform PSHICH transmission based on at least different timings (PSHICH time resources), i.e., B2 (for UE2) and B3 (for UE3).

SL data type indicator: refers to an indicator indicating that a type of data transmission of the Tx UE is unicast, groupcast, or broadcast after a unicast/groupcast session is established. A different HARQ operation may be performed in a physical layer based on each data transmission type. For example, referring to FIG. 7, an independent HARQ operation and resource selection may be determined based on the received data type, which is similar to determining a different PSHICH transmission timing in response to receiving groupcast data.

Initial-to-retransmission timing indicator: A DCI field for indicating timing D. A PSCCH/PSSCH retransmission timing is relatively determined with respect to an initial transmission based on a corresponding field value. In the case of a PSSCH repeat transmission burst in which PSSCH transmission is repetitively performed, an interval between a last PSSCH of the burst and a first PSSCH of a subsequent retransmission PSSCH repetitive transmission burst is indicated by the indicator. This information is also included in the SCI field (PSCCH) and thereby provided from the UE1 to the UE2, which is similar to the pscch/pssch-to-HARQ feedback timing indicator parameter. Therefore, the UE2 (Rx) may receive the corresponding SCI field included in the PSCCH and may acquire time allocation information for PSCCH/PSSCH retransmission.

SCI format field

Max number of the retransmission: indicates a number of retransmissions. The base station may indicate the number of retransmissions to the Tx UE. Alternatively, the Tx UE may directly determine the number of retransmissions and provide the determined number of retransmissions to the Rx UE.

slot offset: a number of slots between initial PSCCH/PSSCH and retransmission PSCCH/PSSCH
{1, ..., 3}

S1 and L1 values for retransmission PSCCH/PSSCH may use the same values as those for the initial transmission or values set by the base station, or may be newly indicated.

Max number of the retransmission: indicates a number of retransmissions. The base station may indicate the number of retransmissions to the Tx UE and then forward to the Rx UE. Alternatively, the Tx UE may directly determine the number of retransmission and may provide the same to the Rx UE.

Example Time Domain Allocation Scheme 2

Figure 8:
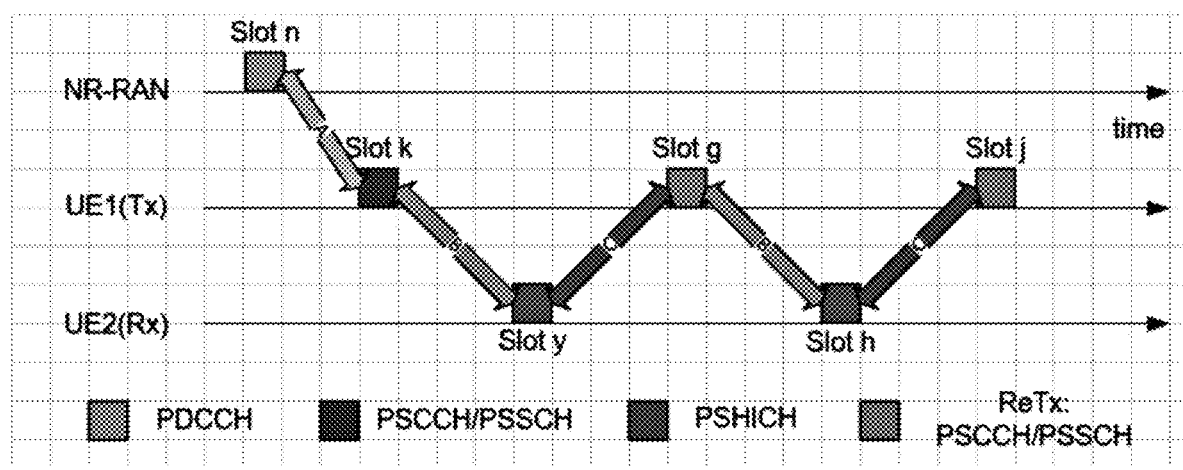
FIG. 8 illustrates an example of a time domain allocation scheme in a network scheduling mode.

FIG. 8 illustrates an example of a time domain allocation scheme in a network scheduling mode.

Here, all of timings A and B are indicated to a Tx UE by a base station through DCI. The Tx UE indicates information about timing B to an Rx UE through SCI (PSCCH). Alternatively, timing A is indicated to the Tx UE by the base station through the DCI and timing B is autonomously determined by the Tx UE and information thereof is indicated to the Rx UE through the SCI (PSCCH). A difference with the aforementioned methods lies in that timing C may be indicated to the Tx UE by the base station through the DCI, or may be pre-configured as a predetermined period value through RRC signaling, or may be configured using pre-configuration information.

Alt 2-1:

Timings A, B, and C are provided from a base station to a Tx UE (UE1) through a DCI field, The Tx UE (UE1) indicates to an Rx UE information about timing B or timings B and C through an SCI field (PSCCH).

Or,

Alt 2-2:

Timings A and C are indicated to the Tx UE by the base station through the DCI field Timing B is autonomously determined by the Tx UE without indication from the base station and the information is indicated to the Rx UE through the SCI field (PSCCH).

Or,

Alt 2-3:

Timings A and C are provided from the base station to the Tx UE through the DCI field, The Tx UE (UE1) indicates information about the indicated timing B to the Rx UE through an SCI field (PSCCH), Timing C is configured for the Tx UE by an upper layer (RRC or MAC) according to signaling of the base station or indicated through a pre-configuration value unless it is a base station scheduling mode.

Or,

Alt 2-4:

Timing A is indicated to the Tx UE by the base station through DCI,

Timing B is autonomously determined by the Tx UE and the information is indicated to the Rx UE through an SCI field (PSCCH), and Timing C is configured for the Tx UE by an upper layer (RRC or MAC) according to signaling of the base station or indicated through a pre-configuration value unless it is in a base station scheduling mode.

The respective detailed methods may use one or only a portion of options depending on a degree of involvement used for the base station or the Tx UE to determine resources on a time domain to perform SL data transmission and reception between NR V2X UEs.

Figure 9:
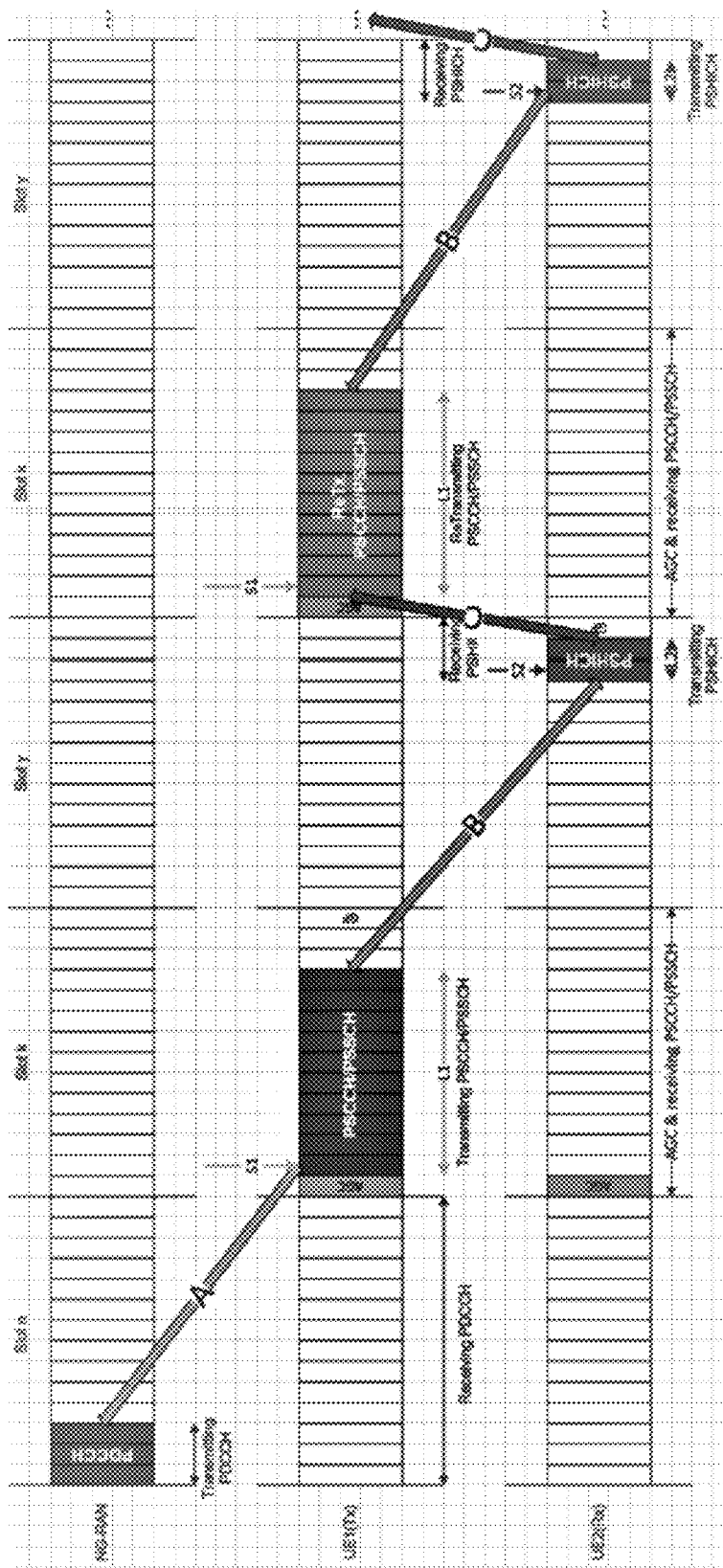
FIG. 9 illustrates an example of a time domain allocation scheme in a network scheduling mode.

FIG. 9 illustrates an example of a further detailed required parameter, field value, operation method based on the aforementioned time domain allocation scheme 2.

Example DCI/SCI Format Fields for NR V2X HARQ Operation

A portion of or all of information included in new DCI format fields described in the following proposed methods may be provided to an Rx UE through an SCI format field in a PSCCH transmitted from a Tx UE.

dci-to-pscch/pssch timing indicator: a DCI field for indicating timing A. Based on a corresponding field value, the following time allocation related information for PSCCH/PSSCH transmission is provided.

slot offset: a number of slots between a PDCCH (DCI) and a PSCCH/PSSCH
{1, ..., 3}

S1: a start OFDM symbol index for PSCCH/PSSCH transmission
{0, ..., 13}

L1: a number of OFDM symbols for PSCCH/PSSCH transmission

{1, . . . 14} or {4, . . . , 14} pscch/pssch-to-HARQ feedback timing indicator: a DCI field for indicating timing B. Based on a corresponding field value, the following time allocation related parameter information for PSHICH transmission is provided. In particular, the information is included in an SCI field (PSCCH) and provided from a UE1 to a UE2. Therefore, the UE2 (Rx) may receive the corresponding SCI field included in at least the PSCCH and then may acquire time allocation information for PSHICH transmission.

It is assumed that ID values corresponding to group-destination-ID and Source-ID used in the aforementioned physical layer are provided to the physical layer by performing a corresponding unicast/groupcast session establishment procedure through an upper layer for unicast/groupcast NR V2X data transmission and reception. Therefore, ID values provided herein are already indicated to the physical layer through the unicast/groupcast session establishment procedure in the upper layer between the Tx and Rx UEs and are considered to be used for the subsequent HARQ operation. The considered upper layer may be an RRC layer or a MAC layer.

SCI format field: included in the SCI field based on a DCI field value and transmitted to the Rx UE through the PSCCH transmitted from the Tx UE.

slot offset: a number of slots between the PSCCH/PSSCH and the PSHICH

{1, . . . , 3}

PSHICH format/resource indicator: If at least one PSHICH transmission format is defined, the corresponding indicator may be indicated to the Tx UE through the DCI field and then provided to the Rx UE through the SCI field in the PSCCH transmitted from the Tx UE. Therefore, a PSHICH transmission method may be determined based on a PSHICH format/resource that is indicated. For example, a PSHICH format using only one or two OFDM symbols or a PSHICH format using 3 to 14 OFDM symbols may be introduced. Here, one format thereof may be indicated and the PSHICH transmission may be performed. Therefore, the PSHICH format and resource may be provided to the Rx UE through the DCI/SCI field and configuration information (e.g., information about at least one of S2, L2, start PRB index, a number of PRBs, an initial cyclic shift (CS) value, and a time domain OCC value as follows) for determining the indicated PSHICH format and resource may be provided in advance based on base station RRC signaling (in-coverage) or pre-configuration (out-of-coverage). Alternatively, all of the format and the following configuration information may be determined based on a PSHICH resource index that is indicated to the UE based on correlation between a PSHICH resource index and format predefined in a standard and the configuration information (i.e., a single PSHICH resource index is mapped to a single format, a single S2, a single L2 value, a single start PRB index, a single initial CS value, and a single OCC value).

S2: a start OFDM symbol index for PSHICH transmission

{0, . . . , 13}

L2: a number of OFDM symbols for PSHICH transmission

{1, . . . 14} or {4, . . . , 14} start PRB index: a first PRB index for performing PSHICH transmission

PRB number: a number of PRBs in which PSHICH transmission is performed initial cyclic shift value: a CS value for PSHICH transmission. A different code resource is provided through this value.

Time domain OCC value: a time domain orthogonal code value for PSHICH transmission. A different code resource is provided based on this value.

Max number of the retransmission: indicates a number of retransmissions. The base station may indicate the number of retransmissions to the Tx UE. Alternatively, the Tx UE may directly determine the number of retransmissions and provide the determined number of retransmissions to the Rx UE.

pshich-to-retransmission timing indicator: a DCI field for indicating timing C. A PSCCH/PSSCH retransmission timing is relatively determined with respect to a previous PSHICH transmission based on a corresponding field value.

slot offset: a number of slots between initial PSCCH/PSSCH and retransmission PSCCH/PSSCH

{1, . . . , 3}

S1 and L1 values for retransmission PSCCH/PSSCH may use the same values as those for the initial transmission or values set by the base station, or may be newly indicated.

Or, if a DCI field value is provided from the Tx UE to the Rx UE as an SCI field value to reduce reception complexity of the Rx UE, the field value is transmitted using the SCI field.

Example Time Domain Allocation Scheme 1 or 2 with Enabling New Type SL-Data

According to current S1 requirements (TS 22.186), relatively high requirements may be required with respect to latency and confidence. Therefore, a transmission scheme such as slot-aggregation may be required. Also, further flexible retransmission schemes may be required.

In examples of time domain allocation schemes 1 and 2, a single HARQ-ACK feedback is assumed with respect to TB transmission through single PSSCH transmission. However, a disadvantage of such a transmission method is a loss of transmission and reception opportunities according to frequent Tx-Rx switching and half duplex constraints. Accordingly, there may be a need to support an additional HARQ transmission and reception method for minimizing such an operation and further effectively performing a HARQ operation.

Figure 10:
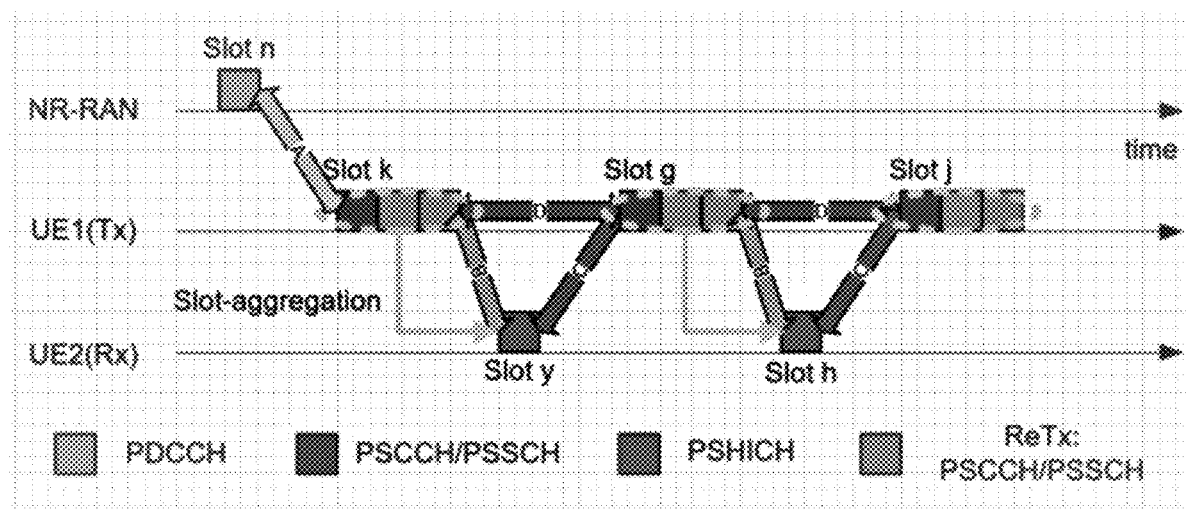
FIG. 10 illustrates an example of a new type of a slide link (SL) data transmission mode.

FIG. 10 illustrates an example of a new type of an SL data transmission mode.

The methods proposed in the above time domain allocation schemes 1 and 2 may apply alike to timings A, B, C, and D of FIG. 10. That is, timings C and D may not coexist and one of the timings C and D may be selectively used based on a transmission method. In contrast, a method proposed herein is an indication method for a time domain allocation according to a new transmission mode indicated by an "SL-Data Tx mode indicator" and an "HARQ-ACK feedback mode indicator".

If a Tx UE employs an SL-data slot aggregation transmission method (i.e., if a single TB is repetitively transmitted with a different redundancy version (RV) over a plurality of consecutive slots, the subsequent timing B/C/D ½ based on a first slot or a last slot in which the single TB is transmitted may be applied based on the time domain allocation scheme 1/2.

Also, if the Tx UE indicates or determines a new HARQ-ACK feedback mode, a subsequent PSHICH transmission may be performed by performing a plurality of HARQ-ACK feedback transmissions corresponding to a plurality of TBs or bundled HARQ-ACK feedback transmission according to the following proposed method. For example, the transmission may be performed as shown in FIG. 11.

Figure 11:
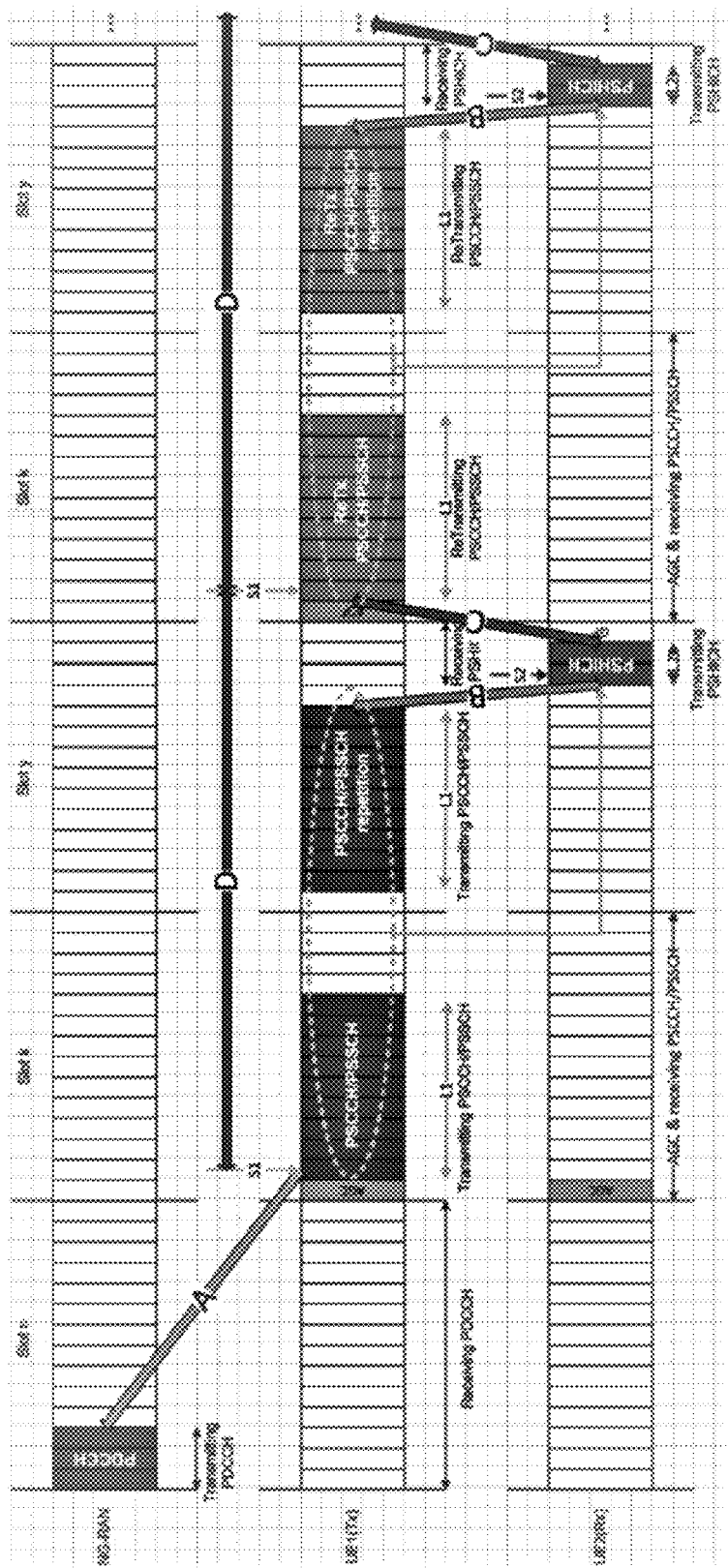
FIG. 11 illustrates an example of a new type of an SL data transmission mode.

Referring to FIG. 11, a single TB may be transmitted based on a different RV value consecutively through a plurality of slots or a plurality of PSSCHs. In this case, the proposed time domain allocation schemes 1 and 2 may apply to a subsequent PSHICH and retransmission timing based on a PSSCH transmitted in a last slot. That is, in the case of the timing B in which repetitive transmission is performed twice, a retransmission timing may be determined as a subsequent PSHICH transmission timing based on a slot/symbol in which a second PSSCH is transmitted. Likewise, in the case of the timing C, a retransmission timing may be determined based on a PSHICH transmission slot. Alternatively, a retransmission timing may be determined based on start of an initial repetitive transmission, which is similar to the timing D. Accordingly, the transmission method as above needs to be determined by the Tx UE. The determination may be indicated by the base station or schedulable another UE or may be autonomously determined by the Tx UE.

Example DCI/SCI Format Fields for NR V2X HARQ Operation

SL-Data Tx mode indicator: an indicator for SL data transmission scheme, as shown in the following proposed FIG. 10 and FIG. 11.
  Tx Mode 1: indicates a transmission method whether a single TB is transmitted per a single PSSCH, or
  Tx Mode 2: indicates a transmission method whether a single TB is transmitted in a PSSCH transmitted over at least one consecutive slot.
  AggregationFactorSL: indicates a value corresponding to a number of slots over which a single TB is repeatedly transmitted. In this case, PSSCH transmission to which a different RV value is applied is performed for each slot. In the above example, a value of 2 is indicated.
  may be included in an SCI format and thereby indicated to an Rx UE.

Figure 12:
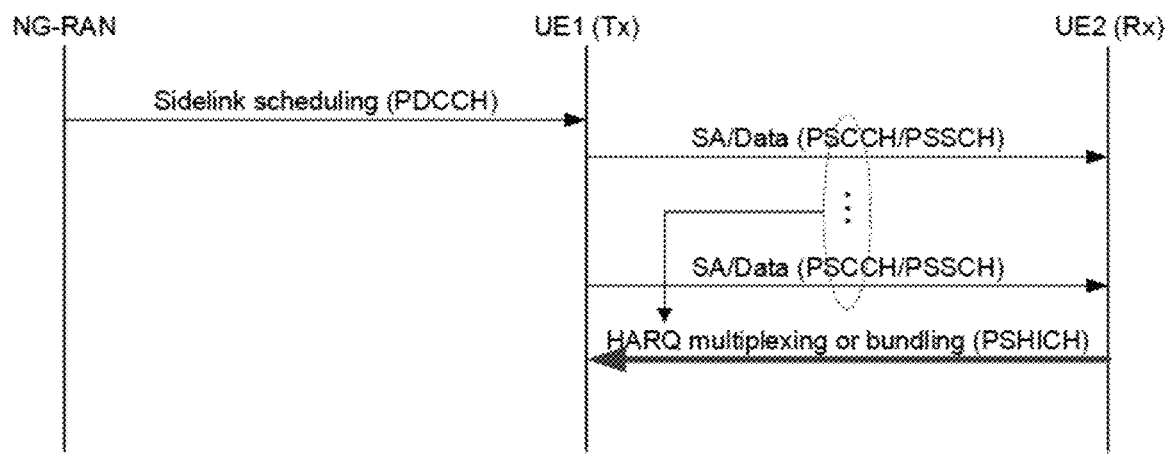
FIG. 12 illustrates an example of an NR V2X HARQ-ACK feedback operation in mode 1.
Figure 13:
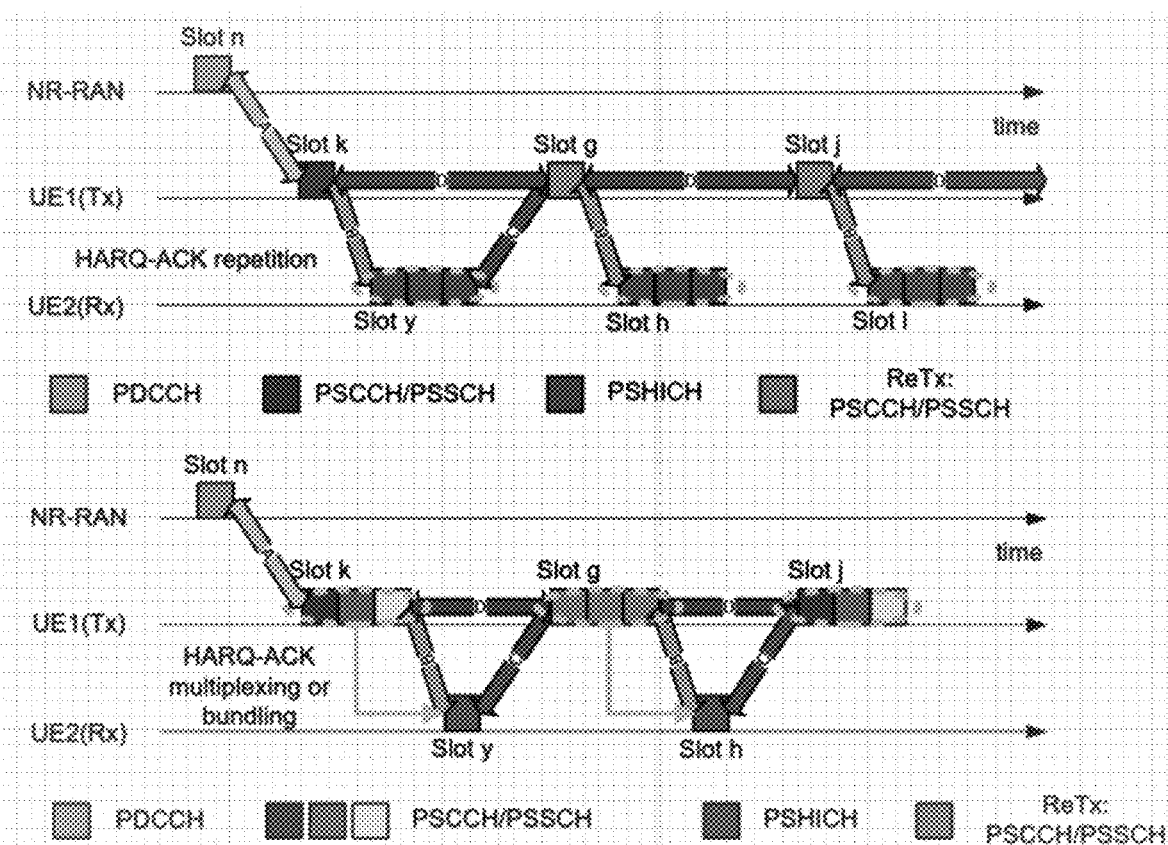
FIG. 13 illustrates an example of a new type of a HARQ feedback mode.

Example Time Domain Allocation Scheme 1 or 2 with Enabling New Type HARQ Feedback FIG. 12 illustrates an example of an NR V2X HARQ-ACK feedback operation in mode 1 and FIG. 13 illustrates an example of a new type of a HARQ feedback mode.

Referring to FIGS. 12 and 13, a HARQ-ACK multiplexing or bundling method in which a single piece of HARQ-ACK information is repeatedly transmitted or corresponds to a plurality of PSSCHs in which one or more different TBs are transmitted to perform HARQ-ACK feedback may be considered.

New DCI format fields for NR V2X HARQ operation
  HARQ-ACK feedback mode indicator: indicates an SL HARQ-feedback transmission scheme as shown in the following proposed FIG. 12 and FIG. 13.
    HARQ-feedback mode 1 (normal): indicates whether to perform HARQ-ACK feedback per single PSSCH transmission, or
    HARQ-feedback mode 2 (HARQ-ACK multiplexing): indicates whether to perform HARQ-ACK feedback by multiplexing a plurality of HARQ-ACK feedback corresponding to at least one PSSCH transmission at a time, or
    HARQ-feedback mode 3 (HARQ-ACK bundling): indicates whether to perform HARQ-ACK feedback by bundling a plurality of HARQ-ACK feedback corresponding to at least one PSSCH transmission.
    The bundling method may perform bundling of CW between the respective PSSCHs or may perform spatial bundling of CW within a single PSSCH (if 2 TB transmission is performed). Therefore, an indicator indicating the bundling method may be indicated in advance.
  may be included in an SCI format and thereby indicated to an Rx UE.
  The Rx UE may determine a corresponding HARQ-feedback transmission method based on an indicated HARQ-feedback mode, and may also determine a HARQ-ACK codebook size (a number of HARQ-ACK bits transmitted), an associated PSHICH transmission format, a resource index, and the like.

Example Time Domain Allocation Considering Different Numerology

Here, additional attention needs to be paid in that channel transmission and reception may be performed by configuring an independent numerology (e.g., SCS, CP length) for each of a PDCCH (DL BWP), a PSCCH (SL-resource pool #n), a PSSCH (SL-resource pool #n), and a PSHICH (SL-resource pool #k). Therefore, this aspect needs to be considered to determine a timing. In the following, a case in which a different numerology is considerable is described from perspective of the PDCCH (DL BWP), the PSCCH, the PSSCH, and PSHICH.

PDCCH numerology is determined based on DL BWP configuration monitored by a Tx UE.
  In the case of providing PSCCH/PSSCH scheduling through the PDCCH (network scheduling mode) and when cross-carrier scheduling is configured for NR-V2X, different numerology may be used.
The same numerology may be assumed for the PSCCH and/or PSSCH generally based on the same resource pool. However, if a control channel and a data channel are time division multiplexed, a relatively higher SCS value than that of the data channel (PSSCH) may be used for fast monitoring (e.g., supporting beam sweeping-based monitoring) for the control channel (e.g., PSCCH).
With assumption that transmission and reception of a PSHICH is generally performed based on the same resource pool as that for the PSCCH and/or PSSCH, the same numerology may be assumed. However, a different SCS value may be indicated and used based on an independent configuration of a HARQ-ACK feedback channel (PSHICH) and the same synchronization as the control channel. In particular, in the case of performing an NR V2X operation on a multi-carrier, HARQ-ACK feedback information about transmission and reception of the data channel performed on a plurality of carriers may be limited to be performed on a specific carrier. In this case, HARQ-ACK feedback transmission may be performed through a PSHICH based on an SCS value corresponding to the specific carrier. In this case, a different SCS value may be assumed compared to single carrier-based NR V2X.
If cross-BWP (resource pool) scheduling is introduced, different numerologies need to be assumed between the respective channels due to independent numerology for each different BWP (resource pool).

As discussed above, a base station provides information about timings A, B, C, and D to a Tx UE through a DCI format. Alternatively, the Tx UE itself present in OOC may determine a portion of or all of the timings and may indicate the determined timing to an Rx UE. A corresponding unit may be basically a number of slots and/or a number of OFDM symbols. An SL V2X UE may receive configuration information about related PSSCH-to-HARQ Feedback transmission timing in advance to perform the above operation. In-coverage UEs may receive the corresponding information from the base station through broadcast or dedicated signaling. Out-of-coverage UEs may be pre-configured.

Subsequently, for example, the Tx UE provides PSHICH transmission timing information received from the base station to the Rx UE through a PSCCH for forwarding SCI.

Figure 14:
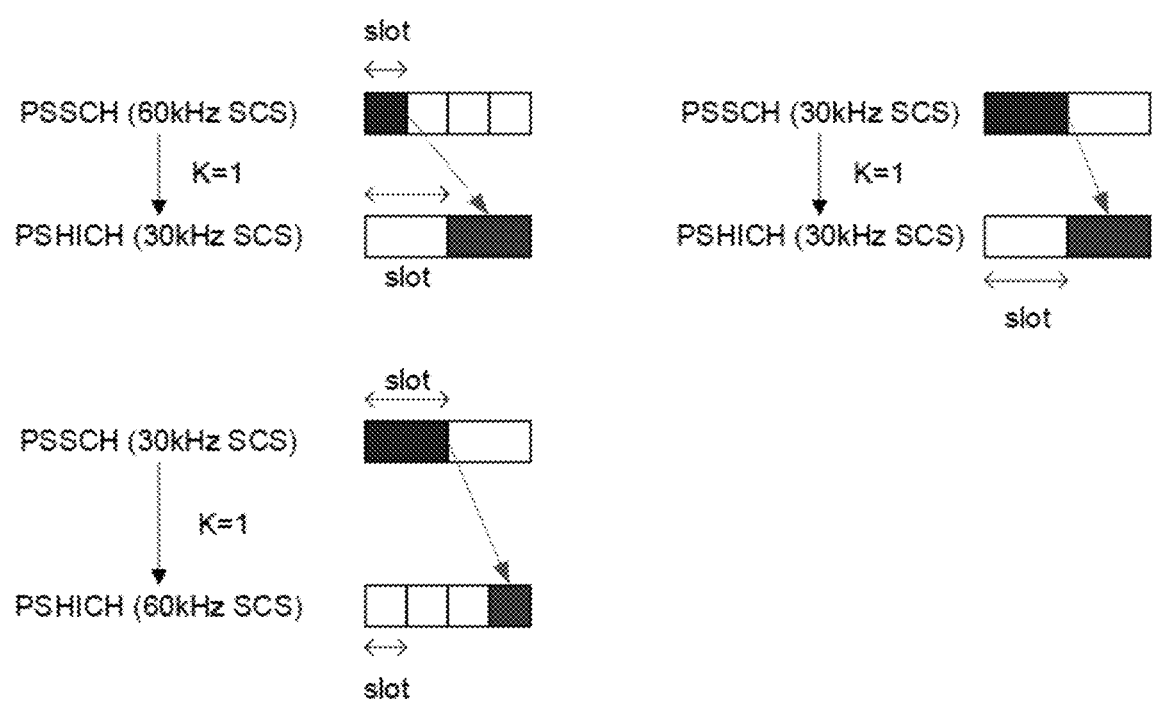
FIG. 14 illustrates an example of a PSHICH transmission timing indicated when the same or different subcarrier spacing (SCS) is set between a Physical Sidelink Shared Channel (PSSCH)/Physical Sidelink Control Channel (PSCCH) and a PSHICH.

FIG. 14 illustrates an example of a PSHICH transmission timing indicated when the same or different SCS is set between a PSSCH/PSCCH and a PSHICH.

FIG. 14 illustrates an example of a method of applying a transmission timing value (K) indicated when a different SCS value is set between the PSSCH and the PSHICH. For example, if an SCS value of the PSSCH is greater than or equal to an SCS value of the PSHICH, a PSHICH transmission slot to which K=0 applies refers to a slot that is temporally overlapped with a PSSCH transmission slot. Otherwise, the PSHICH transmission slot to which K=0 applies is determined as a PSHICH slot corresponding to a slot end in which the PSSCH is received.

Additionally, if the PSCCH indicating SL V2X SPS release is received, corresponding HARQ-feedback transmission is applied based on a slot in which the PSCCH is received.

If PSSCH transmissions are set, the HARQ-feedback transmission is performed based on the last PSSCH transmission among the repetitive PSSCH transmissions.

Figure 15:
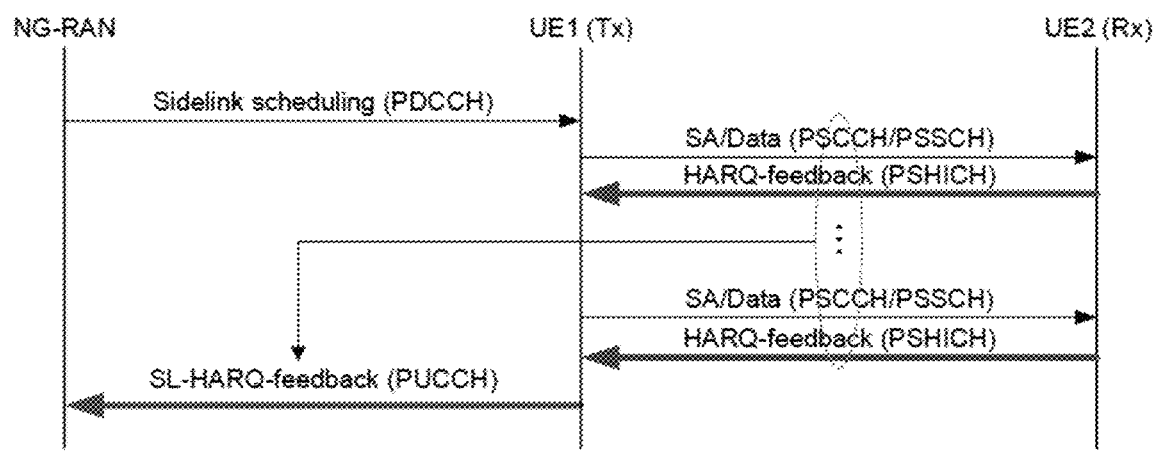
FIG. 15 illustrates an example of a feedback procedure and method for reporting an SL channel status and an SL data transmission and reception status.

Also, FIG. 15 illustrates an example of a feedback procedure and method for reporting an SL channel status and an SL data transmission and reception status.

FIG. 15 illustrates a single signaling flow about unicast or groupcast data transmission that requires HARQ-feedback in a network scheduling mode. In the above procedure, a base station (NG-RAN) provides scheduling about SL data to be transmitted from a UE1 (SL V2X Tx UE) through a PDCCH. Based on the information, the UE1 may transmit a PSCCH/PSSCH including SA/Data information to a UE2 (SL V2X Rx UE). The SA/Data information transmitted from the UE1 is received at the UE2 and the UE2 performs a demodulation operation. The UE2 transmits HARQ-feedback information (A/N) corresponding to a demodulation result to the UE1 through a PSHICH and reports information regarding whether previously performed data reception is a success.

However, referring to FIG. 15, if NACK occurs a relatively large number of times, the Tx UE or the Rx UE may need to report to the base station about an SL channel environment through a Uu link (a link between NG-RAN and UE), that is, through a Physical Uplink Control Channel (PUCCH) or a Physical Uplink Shared Channel (PUSCH). In this case, the Tx UE or the Rx UE that is an RRC CONNECTED UE may report SL channel environment information for consideration of the following SL scheduling. HARQ-ACK and CSI may be provided to the base station as such SL channel environment report information.

Figure 16:
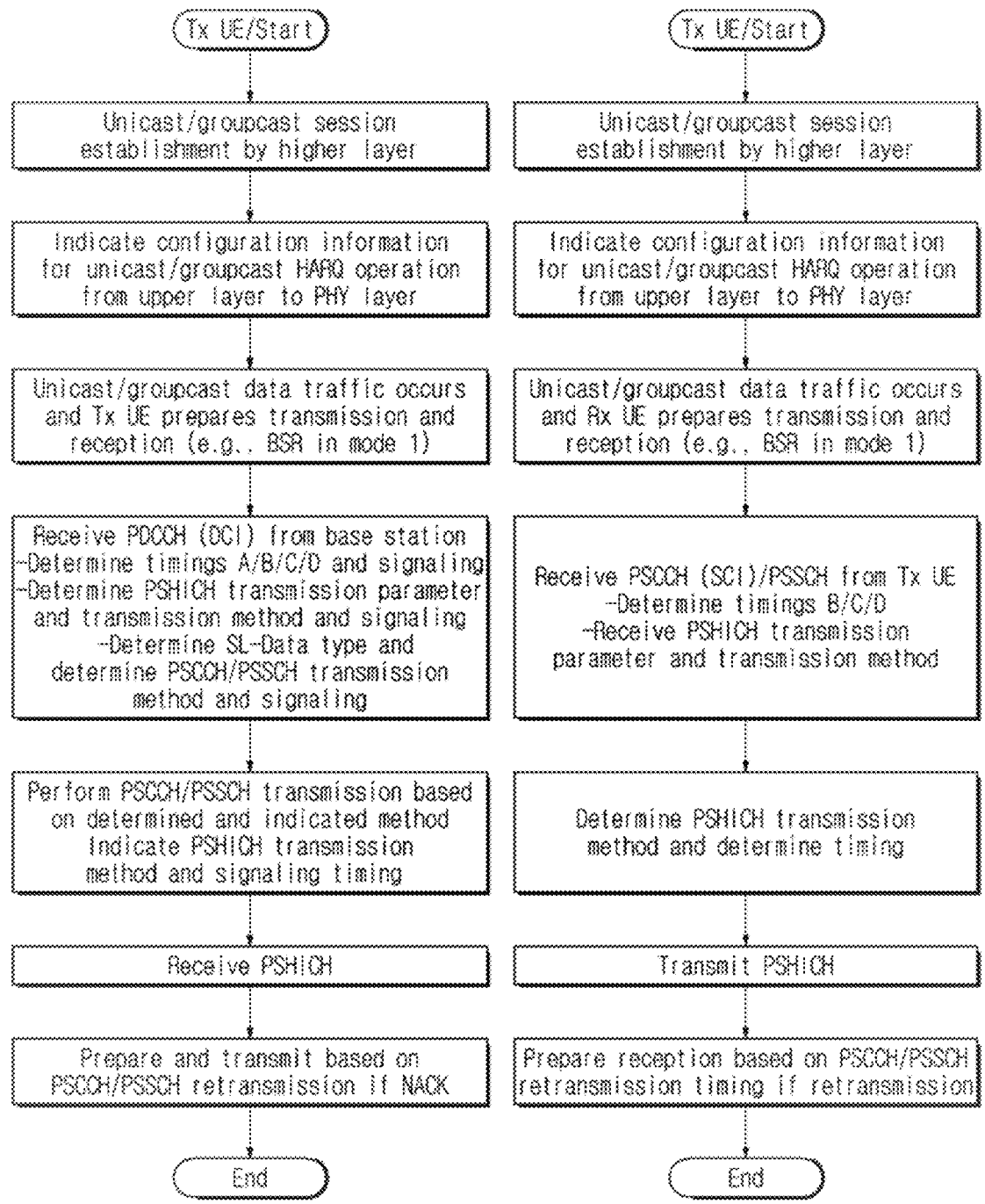
FIG. 16 illustrates an example of an operation of a UE that performs unicast/groupcast NR V2X SL HARQ transmission and reception.

Also, FIG. 16 illustrates an example of an operation of a UE that performs unicast/groupcast NR V2X SL HARQ transmission and reception.

FIG. 16 illustrates an operation flow of a UE that performs unicast/groupcast NR V2X SL HARQ transmission and reception according to the present disclosure. Base station signaling varies based on mode 1 and mode 2 (including sub-modes). The operation flow of FIG. 16 is illustrated based on mode 1, however, may also apply to mode 2 aside from base station signaling. Initially, a Tx UE and an Rx UE perform a session establishment process by a higher layer, that is, an upper layer for unicast/groupcast SL data transmission and reception, and forward and indicate HARQ operation related configuration information (e.g., destination ID/source ID/group ID, etc.) to a physical layer. Unicast/groupcast data traffic occurs in the Tx UE and the Tx UE requests the base station for related scheduling and reports to the base station about a buffer status report (BSR) and receives mode 1-based data scheduling from the base station. The base station provides information required for a subsequent HARQ operation to the Tx UE through the PDCCH using new DCI format fields according to the proposed method. The Tx UE prepares PSCCH/PSSCH transmission based on the indicated information or information determined by the Tx UE and performs the transmission. If the PSHICH is received from the Rx UE based on the indicated timing and NACK is received, the Tx UE prepares and performs PSCCH/PSSCH retransmission based on the indicated timing.

The Rx UE prepares corresponding data transmission and reception after a corresponding session is established through the unicast/groupcast session establishment process with the Tx UE. The Rx UE receives the PSCCH/PSSCH from the Tx UE and performs demodulation in a resource pool limited by the Tx UE or a PSCCH monitoring section. The Rx UE reports a corresponding result to the Tx UE through the PSHICH based on the indicated or determined timing. If retransmission is performed subsequently, the Rx UE performs reception based on the indicated or determined timing.

Figure 17:
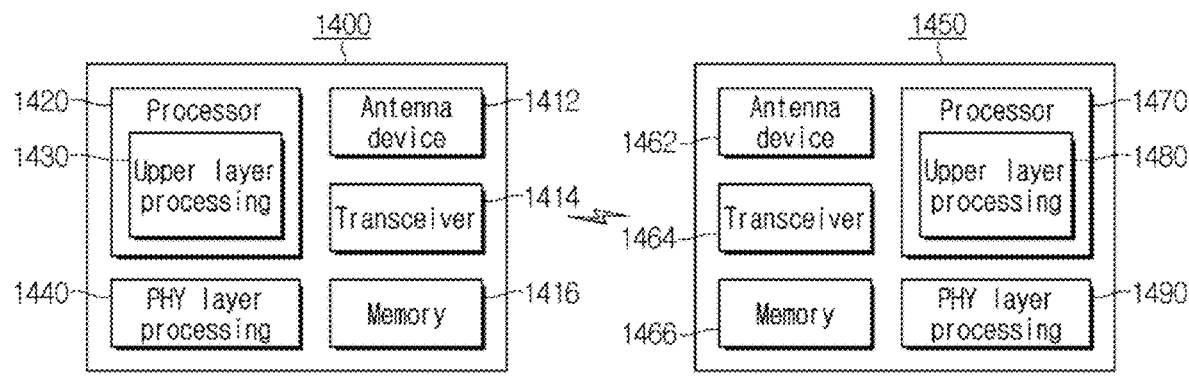
FIG. 17 is a diagram illustrating a configuration of a base station device and a terminal device according to the present disclosure.

FIG. 17 illustrates a configuration of a base station device and a terminal device according to the present disclosure.

Referring to FIG. 17, the base station device 1400 may include a processor 1420, an antenna device 1412, a transceiver 1414, and a memory 1416.

The processor 1420 may perform baseband-related signal processing and may include an upper layer processing 1430 and a physical (PHY) layer processing 1440. The upper layer processing 1430 may process an operation of a Medium Access Control (MAC) layer, a Radio Resource Control (RRC) layer, or more upper layers. The PHY layer processing 1440 may process an operation (e.g., uplink received signal processing and downlink transmission signal processing) of a PHY layer. The processor 1420 may control the overall operation of the base station device 1400 in addition to performing the baseband-related signal processing.

The antenna device 1412 may include at least one physical antenna. If the antenna device 1412 includes a plurality of antennas, MIMO transmission and reception may be supported. The transceiver 1414 may include a radio frequency (RF) transmitter and an RF receiver. The memory 1416 may store operation processed information of the processor 1420 and software, an operating system (OS), an application, etc., associated with an operation of the base station device 1400, and may include a component such as a buffer.

The processor 1420 of the base station device 1400 may be configured to implement an operation of a base station in the examples disclosed herein.

The terminal device 1450 may include a processor 1470, an antenna device 1462, a transceiver 1464, and a memory 1466. The terminal device 1450 includes all of related operations and devices for NR V2X SL data transmission and reception.

The processor 1470 may perform baseband-related signal processing and may include an upper layer processing 1480 and a PHY layer processing 1490. The upper layer processing 1480 may process an operation of a MAC layer, an RRC layer, or more upper layers. The PHY layer processing 1490 may process an operation (e.g., downlink received signal processing and uplink transmission signal processing) of a PHY layer. The processor 1470 may control the overall operation of the terminal device 1450 in addition to performing the baseband-related signal processing.

The antenna device 1462 may include at least one physical antenna. If the antenna device 1462 includes a plurality of antennas, MIMO transmission and reception may be supported. The transceiver 1464 may include an RF transmitter and an RF receiver. The memory 1466 may store operation processed information of the processor 1470 and software, an OS, an application, etc., associated with an operation of the terminal device 1450, and may include a component such as a buffer.

The processor 1470 of the terminal device 1450 may be configured to implement an operation of a terminal in the examples described herein.

The description made above in the examples of the present disclosure may apply alike to operations of the base station device 1700 and the terminal device 1750 and a further description related thereto is omitted.

The present disclosure may apply to various systems. Effects obtainable from the present disclosure are not limited thereto and other effects not described herein may be explicitly understood by one of ordinary skill in the art to which this disclosure pertains from the description set forth as below.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

Also, for example, the terminal device 1450 may be the aforementioned NR V2X sidelink UE. Here, for example, the terminal device 1450 may perform (or determine) an NR V2X sidelink HARQ operation as described in the aforementioned examples. Here, for example, to support an HARQ operation for NR V2X sidelink unicast/groupcast data transmission and reception, the terminal device 1450 transmits and receives control information and data information to and from the base station device 1400 and/or a Tx UE and determines the HARQ operation to be performed between associated UEs in a unicast/groupcast session. In more detail, the terminal device 140 may indicate (or determine) a time resource allocation for PDCCH, PSCCH/PSSCH, PSHICH, and retransmission PSCCH/PSSCH for NR SL V2X HARQ based on the aforementioned methods. Also, for example, the terminal device 1450 may receive an instruction or induce (or determine) an NR SL V2X data transmission method and a HARQ-ACK feedback transmission method, as described above. Here, the processor 1470 of the terminal device 1450 may perform a detailed operation for the aforementioned examples. Here, the processor 1470 of the terminal device 1450 may use at least one of the antenna device 1462, the transceiver 1464, and the memory 1466 while performing an operation of the examples. However, it is provided as an example only and the present disclosure is not limited thereto.

Meanwhile, the base station device 1400 may be one of the aforementioned base stations, for example, ng-eNB and gNB. Here, similar to the aforementioned example, the base station device 1400 may provide control information about the NR SL HARQ operation to the terminal device 1450 as ng-eNB/gNB. Here, the terminal device 1450 may induce (or determine) time resource allocation for the NR V2X SL HARQ operation and relevant control information based on information received from the base station device 1400. Here, the processor 1420 of the base station device 1400 may perform a detailed operation with respect to the aforementioned examples. The processor 1420 of the base station device 1400 may use at least one of the antenna device 1412, the transceiver 1414, and the memory 1416. However, it is provided as an example only and the present disclosure is not limited thereto.

What is claimed is:

1. A method comprising:
   receiving, by a wireless user device from a network, at least one message associated with sidelink communication comprising:
      a first parameter indicating a starting symbol for sidelink communication; and
      a second parameter indicating a quantity of symbols for sidelink communication;
   receiving, by the wireless user device, downlink control information (DCI), associated with sidelink communication, comprising a field indicating a slot offset, wherein the slot offset is associated with a quantity of slots between a first slot in which the DCI is received and a second slot for a scheduled sidelink transmission;
   transmitting, during at least one symbol of the second slot, sidelink data from the wireless user device to one or more second wireless user devices, wherein the transmitting the sidelink data is based on:
      the first parameter;
      the second parameter; and
      the slot offset; and
   receiving, from the one or more second wireless user devices, a response to the sidelink data.

2. The method of claim 1, further comprising:
   transmitting, to the network, a sidelink hybrid automatic repeat request (HARD) report indicating the response.

3. The method of claim 1, further comprising transmitting, during at least one symbol of the second slot, sidelink control information (SCI) via a physical sidelink control channel (PSCCH),
   wherein the transmitting the sidelink data comprises transmitting the sidelink data via a physical sidelink shared channel (PSSCH).

4. The method of claim 3, wherein the SCI corresponds to a first SCI format, and wherein the SCI comprises an SCI format field indicating a second SCI format.

5. The method of claim 3, wherein the SCI indicates a resource for transmitting the response.

6. The method of claim 3, wherein the transmitting the SCI comprises transmitting, during a first quantity of symbols of the second slot, the SCI, wherein the transmitting the sidelink data comprises transmitting, during a second quantity of symbols of the second slot, the sidelink data, wherein the first quantity of symbols precedes, in time, the second quantity of symbols, and wherein the first quantity of symbols comprises the starting symbol for sidelink communication.

7. The method of claim 1, further comprising transmitting, during at least one symbol of the second slot, sidelink control information (SCI) via a physical sidelink control channel (PSCCH), wherein the SCI comprises a field indicating a cast type of a plurality of cast types.

8. The method of claim 7, wherein the plurality of cast types comprises broadcast, groupcast, and unicast, and wherein each cast type of the plurality of cast types is associated with a different hybrid automatic repeat request (HARQ) feedback operation.

9. The method of claim 1, wherein the response comprises:

acknowledgement information indicating successful reception of the sidelink data; or negative acknowledgement information indicating unsuccessful reception of the sidelink data.

10. The method of claim 1, wherein the slot offset indicates integer k, wherein the first slot corresponds to slot n, and wherein the second slot corresponds to slot n+k.

11. A method comprising:

receiving, by a wireless user device from a network, at least one message associated with sidelink communication comprising:

a first parameter indicating a starting symbol for sidelink communication; and a second parameter indicating a quantity of symbols for sidelink communication;

receiving, by the wireless user device, downlink control information (DCI), associated with sidelink communication, comprising a field indicating a slot offset, wherein the slot offset is associated with a quantity of slots between a first slot in which the DCI is received and a second slot for a scheduled sidelink transmission; and transmitting, during at least one symbol of the second slot, sidelink control information (SCI) from the wireless user device to one or more second wireless user devices; and transmitting, during at least one symbol of the second slot, sidelink data from the wireless user device to one or more second wireless user devices, wherein the transmitting the SCI and the transmitting the sidelink data are based on:

the first parameter;
the second parameter; and
the slot offset.

12. The method of claim 11, further comprising:

receiving, from the one or more second wireless user devices, one or more responses to the sidelink data; and transmitting, to the network, a sidelink hybrid automatic repeat request (HARD) report indicating the one or more responses.

13. The method of claim 12, wherein the SCI indicates one or more resources for transmitting the one or more responses.

14. The method of claim 11, wherein the SCI is transmitted via a physical sidelink control channel (PSCCH), and wherein the sidelink data is transmitted via a physical sidelink shared channel (PSSCH).

15. The method of claim 11, wherein the SCI corresponds to a first SCI format, and wherein the SCI comprises an SCI format field indicating a second SCI format.

16. The method of claim 11, wherein the SCI comprises a field indicating a cast type of a plurality of cast types.

17. The method of claim 16, wherein the plurality of cast types comprises broadcast, groupcast, and unicast, and wherein each cast type of the plurality of cast types is associated with a different hybrid automatic repeat request (HARQ) feedback operation.

18. The method of claim 11, wherein the transmitting the SCI comprises transmitting, during a first quantity of symbols of the second slot, the SCI, wherein the transmitting the sidelink data comprises transmitting, during a second quantity of symbols of the second slot, the sidelink data, wherein the first quantity of symbols precedes, in time, the second quantity of symbols, and wherein the first quantity of symbols comprises the starting symbol for sidelink communication.

19. The method of claim 11, wherein the slot offset indicates integer k, wherein the first slot corresponds to slot n, and wherein the second slot corresponds to slot n+k.

20. A method comprising:

receiving, by a wireless user device from a network, information indicating a starting symbol for sidelink communication and a quantity of symbols for sidelink communication;

receiving, by the wireless user device, downlink control information (DCI), associated with sidelink communication, comprising a field indicating a slot offset, wherein the slot offset is associated with a quantity of slots between a first slot in which the DCI is received and a second slot for a scheduled sidelink transmission; and transmitting, during at least one symbol of the second slot, sidelink control information (SCI) from the wireless user device to one or more second wireless user devices; and transmitting, during at least one symbol of the second slot, sidelink data from the wireless user device to one or more second wireless user devices, wherein the transmitting the SCI and the transmitting the sidelink data are based on:

the starting symbol for sidelink communication;
the quantity of symbols for sidelink communication; and
the slot offset.

21. The method of claim 20, wherein the transmitting the SCI comprises transmitting, during a first quantity of symbols of the second slot, the SCI, wherein the transmitting the sidelink data comprises transmitting, during a second quantity of symbols of the second slot, the sidelink data, wherein the first quantity of symbols precedes, in time, the second quantity of symbols, and wherein the first quantity of symbols comprises the starting symbol for sidelink communication.

22. The method of claim 20, wherein the SCI corresponds to a first SCI format, and wherein the SCI comprises an SCI format field indicating a second SCI format.

23. The method of claim 20, wherein the SCI comprises a field indicating a cast type of a plurality of cast types.

24. The method of claim 20, wherein the slot offset indicates integer k, wherein the first slot corresponds to slot n, and wherein the second slot corresponds to slot n+k.

* * * * *